US008473392B1

(12) United States Patent  
Hinchey

(10) Patent No.: US 8,473,392 B1  
(45) Date of Patent: Jun. 25, 2013

(54) SYSTEM AND METHOD FOR EVALUATION AND COMPARISON OF VARIABLE ANNUITY PRODUCTS

(76) Inventor: Ryan Hinchey, Avon, CT (US)

( * ) Notice: Subject to any disclaimer, the term of this patent is extended or adjusted under 35 U.S.C. 154(b) by 0 days.

(21) Appl. No.: 12/902,003

(22) Filed: Oct. 11, 2010

Related U.S. Application Data

(60) Provisional application No. 61/250,062, filed on Oct. 9, 2009.

(51) Int. Cl.  
*G06Q 40/00* (2012.01)

(52) U.S. Cl.  
USPC .............. 705/35; 705/4; 705/36 R; 705/37

(58) Field of Classification Search  
USPC ............................ 705/4, 35–37  
See application file for complete search history.

(56) References Cited

U.S. PATENT DOCUMENTS

| | | | | |
|---|---|---|---|---|
| 5,291,398 A * | 3/1994 | Hagan | | 705/4 |
| 7,120,601 B2 * | 10/2006 | Chen et al. | | 705/36 R |
| 7,577,597 B1 * | 8/2009 | Allison et al. | | 705/35 |
| 7,634,420 B2 * | 12/2009 | Kendall et al. | | 705/4 |
| 7,660,757 B2 * | 2/2010 | Baiye | | 705/35 |
| 7,707,092 B1 * | 4/2010 | Freed | | 705/36 R |
| 7,769,664 B2 * | 8/2010 | Egan | | 705/36 R |
| 7,778,907 B1 * | 8/2010 | Haskins et al. | | 705/36 R |
| 7,813,989 B2 * | 10/2010 | Jones et al. | | 705/36 R |
| 7,844,527 B2 * | 11/2010 | Mannion | | 705/36 R |
| 8,024,203 B2 * | 9/2011 | Kendall et al. | | 705/4 |
| 8,095,397 B2 * | 1/2012 | Gray et al. | | 705/4 |
| 8,131,571 B2 * | 3/2012 | Vadiveloo | | 705/4 |
| 8,315,891 B2 * | 11/2012 | Kendall et al. | | 705/4 |
| 2002/0091613 A1 * | 7/2002 | Kendall et al. | | 705/37 |
| 2003/0097324 A1 * | 5/2003 | Speckman | | 705/36 |
| 2003/0191672 A1 * | 10/2003 | Kendall et al. | | 705/4 |
| 2004/0088236 A1 * | 5/2004 | Manning | | 705/35 |
| 2006/0053037 A1 * | 3/2006 | Kendall et al. | | 705/4 |
| 2008/0071661 A1 * | 3/2008 | Jeudy et al. | | 705/36 R |
| 2008/0189223 A1 * | 8/2008 | Baiye | | 705/36 R |
| 2009/0271224 A1 * | 10/2009 | Lange | | 705/4 |
| 2009/0307016 A1 * | 12/2009 | Gray et al. | | 705/4 |
| 2010/0030584 A1 * | 2/2010 | Guilbert et al. | | 705/4 |
| 2010/0070310 A1 * | 3/2010 | Ferguson et al. | | 705/4 |
| 2012/0066009 A1 * | 3/2012 | Kendall et al. | | 705/4 |

OTHER PUBLICATIONS http://corporate.morningstar.com/us/asp/detail.aspx?xmlfile=5009. xml—"Variable Annuity Contact Comparison Report" and "Hypo Report".  
http://corporate.morningstar.com/us/asp/detail.aspx?xmlfile=5009. xml—"Hypo Report," Sep. 24, 2008.

* cited by examiner

*Primary Examiner* — Narayanswamy Subramanian  
(74) *Attorney, Agent, or Firm* — Waddey & Patterson, P.C.; Mark J. Patterson

(57) ABSTRACT

In a system and method for evaluating and comparing variable annuities, ranking and comparison of annuities and their guaranteed riders is performed by coding the performance of the annuities into a computer model based on the behavior of one or more annuity products as described in a prospectus. A user is provided with a computer interface to input his/her preferences and then view anticipated performance. The anticipated performance is based on one or more validated scenarios of future market performance. The output is in part based on showing the total value of two or more different annuities over time as a bar chart. Each bar presents the total withdrawals to date in a lower portion and the cash surrender value as a top portion.

12 Claims, 33 Drawing Sheets

Fig. 2
(Prior Art)

Appendix B
Accumulation Unit Values For Each Investment Division

These tables and bar charts show fluctuations in the Accumulation Unit Values for two of the possible mixes offered within the Deferred Annuity for each Investment Division from year end to year end. A different share class of the Metropolitan Fund and Met Investors Fund Portfolios was available prior to May 1, 2004. Lower Separate Account charges for the American Funds Investment Divisions were in effect prior to May 1, 2004. The accumulation unit values prior to May 1, 2004 reflect the lower 12b-1 Plan fees for the Metropolitan Fund and the Met Investors Fund Portfolios and lower Separate Account charges for the American Fund's Investment Divisions then in effect. Values after April 30, 2004 reflect the higher 12b-1 Plan fees and Separate Account charges currently in place. In addition, different charges for certain optional benefits were in effect prior to May 1, 2003. Therefore, the accumulation unit values prior to May 1, 2003, for Deferred Annuities with these optional benefits reflect the lower charges then in effect. Values after April 30, 2003, reflect the higher charges currently in place. A lower charge for the Guaranteed Minimum Income Benefit when it was purchased with either of the optional death benefits was in effect from May 1, 2004 through April 30, 2005. A lower charge for the GMIB Plus I was in effect prior to February 26, 2007. Lower charges for the GMIB Plus II, Enhanced Death Benefit and LWG II were in effect prior to February 24, 2009 and/or May 4, 2009. These lower charges are not reflected in the tables below. The information in these tables has been derived from the Separate Account's full financial statements or other reports (such as the annual report). The first table shows the Deferred Annuity mix that bears the total highest charge, and the second table shows the Deferred Annuity mix that bears the total lowest charge. The mix with the total highest charge has these features: Bonus Class, the Greater of Annual Step-Up or 5% Annual Increase Death Benefit, Earnings Preservation Benefit, Charges for the Enhanced Death Benefit, the optional Guaranteed Minimum Income Benefits, the optional Guaranteed Withdrawal Benefit, and the optional Guaranteed Minimum Accumulation Benefit are made by canceling accumulation units and, therefore, these charges are not reflected in the Accumulation Unit Value. However, purchasing these options with the others will result in a higher overall charge. The mix with the total lowest charge has these features: B Class and no optional benefit. All other possible mixes for each Investment Division within the Deferred Annuity appear in the SAI, which is available upon request without charge by calling 1-800-638-7732.

Preference Plus Select Deferred Annuities
Highest Possible Mix
2.30 Separate Account Charge

| Investment Division | Year | Beginning of Year Accumulation Unit Value | End of Year Accumulation Unit Value | Number of Accumulation Units End of Year |
|---|---|---|---|---|
| American Funds Balanced Allocation Investment Division (Class Q)(e) | 2008 | $10.00 | $ 6.96 | 412.25 |
| American Funds Bond Division (Class 2)(k) | 2006 | 13.48 | 14.05 | 2,260.99 |
| | 2007 | 14.05 | 14.17 | 9,257.00 |
| | 2008 | 14.17 | 12.53 | 7,101.80 |
| American Funds Global Small Capitalization Investment Division (Class 2) | 2001 | 3.39 | 3.03 | 0.00 |
| | 2002 | 3.03 | 10.29 | 0.00 |
| | 2003 | 10.29 | 15.42 | 0.00 |
| | 2004 | 15.42 | 18.19 | 13,630.80 |
| | 2005 | 18.19 | 22.25 | 19,596.91 |
| | 2006 | 22.25 | 26.94 | 24,763.77 |
| | 2007 | 26.94 | 31.92 | 28,149.24 |
| | 2008 | 31.92 | 14.47 | 23,694.86 |
| American Funds Growth Allocation Investment Division (Class Q)(e) | 2008 | 9.99 | 6.32 | 111,993.18 |

141

| Investment Division | Year | Year Accumulation Unit Value | End of Year Accumulation Unit Value | Accumulation Units End of Year |
|---|---|---|---|---|
| American Funds Growth Investment Division (Class 2) | 2001 | 73.98 | 70.77 | 0.00 |
| | 2002 | 95.15 | 70.14 | 0.00 |
| | 2003 | 70.14 | 93.63 | 0.00 |
| | 2004 | 93.63 | 102.78 | 11,491.63 |
| | 2005 | 102.78 | 116.54 | 11,889.33 |
| | 2006 | 116.54 | 125.35 | 12,469.33 |
| | 2007 | 125.35 | 137.40 | 11,555.27 |
| | 2008 | 137.40 | 75.11 | 10,953.89 |
| American Funds Growth-Income Investment Division (Class 2) | 2001 | 73.98 | 70.77 | 0.00 |
| | 2002 | 70.77 | 56.39 | 0.00 |
| | 2003 | 56.39 | 72.87 | 0.00 |
| | 2004 | 72.87 | 78.48 | 11,225.16 |
| | 2005 | 78.48 | 81.05 | 10,819.00 |
| | 2006 | 81.05 | 91.12 | 13,217.06 |
| | 2007 | 91.12 | 93.39 | 13,454.75 |
| | 2008 | 93.39 | 56.63 | 10,951.54 |
| American Funds Moderate Allocation Investment Division (Class Q) | 2008 | 10.01 | 7.63 | 11,468.33 |
| BlackRock Aggressive Growth Investment Division (Class E) | 2001 | 32.98 | 30.99 | 0.00 |
| | 2002 | 30.99 | 21.56 | 0.00 |
| | 2003 | 21.56 | 29.63 | 0.00 |
| BlackRock Aggressive Growth Investment Division (Class B) | 2004 | 29.05 | 32.02 | 470.09 |
| | 2005 | 32.02 | 34.56 | 351.47 |
| | 2006 | 34.56 | 35.96 | 342.15 |
| | 2007 | 35.96 | 42.25 | 1,604.22 |
| | 2008 | 42.25 | 22.36 | 5,150.56 |
| BlackRock Bond Income Investment Division (formerly SSR Income (Class E) | 2001 | 34.86 | 35.69 | 0.00 |
| | 2002 | 35.69 | 320.53 | 0.00 |
| BlackRock Bond Income Investment Division (Class E)(a) | 2002 | 35.97 | 37.72 | 0.00 |
| | 2003 | 37.72 | 38.96 | 0.00 |
| BlackRock Bond Income Investment Division (Class B) | 2004 | 35.93 | 37.01 | 4,465.70 |
| | 2005 | 37.01 | 36.95 | 7,893.69 |
| | 2006 | 36.95 | 37.60 | 8,645.26 |
| | 2007 | 37.60 | 38.96 | 12,697.65 |
| | 2008 | 38.96 | 36.67 | 9,177.68 |
| BlackRock Diversified Investment Division (Class E) | 2001 | 32.43 | 31.50 | 0.00 |
| | 2002 | 31.50 | 26.49 | 0.00 |
| | 2003 | 26.49 | 31.17 | 0.00 |
| BlackRock Diversified Investment Division (Class B) | 2004 | 30.09 | 32.27 | 6,385.61 |
| | 2005 | 32.27 | 32.43 | 15,553.06 |
| | 2006 | 32.43 | 34.94 | 17,189.51 |
| | 2007 | 34.94 | 36.06 | 6,540.78 |
| | 2008 | 36.06 | 26.44 | 4,369.81 |
| BlackRock Large Cap Investment Division (Class E) | 2001 | $59.93 | $55.73 | 0.00 |
| | 2002 | 55.73 | 40.18 | 0.00 |
| | 2003 | 40.18 | 51.07 | 0.00 |

| Generic | Metlife | product type |
|---|---|---|
| ratchet | highest anniversary value | |
| ratchet | reset | GMWB |
| rollup (base) | annual increase amount | |
| reset | step-up | |
| Mortality and Expense and Admin Fee (M&E&A fee) | separate account fee | |
| benefit base | income base | GMIB |
| benefit base | Total Guaranteed Withdrawal Amount | GLWB |
| benefit base | guaranteed withdrawal amount | GMWB |
| benefit balance | remaining guaranteed withdrawal amount | GLWB |
| benefit balance | benefit base | GMWB |
| Guaranteed Lifetime Withdrawal Benefit (GLWB) | Lifetime withdrawal guarantee benefit | |
| Guaranteed Minimum Withdrawal Benefit (GMWB) | Guaranteed Withdrawal Benefit | |
| premium | purchase payment | |
| guaranteed withdrawal amount (gwa) | annual benefit payment | |
| deferal bonus | compounding income amount | |
| non - excess withdrawal | same | |
| excess withdrawal | same | |
| guaranteed principal adjustment | same | |

FIG. 5

| Asset Class | Market Proxies |
|---|---|
| Large Cap Equity | U.S. Equity S&P500 Total Return Index |
| Small Cap Equity | U.S. Small Capitalization Index |
| International Equity | MSCI-EAFE $USD Total Return Index |
| Aggressive Equity | Emerging Markets, NASDAQ, Hang Seng |
| US Government Bond | U.S. Intermediate Term Government Bonds |
| US Corporate Bond | U.S. Long Term Corporate Bonds |
| Money Market | 3 Month Treasury returns |
| Interest Rates | US Treasury Rates |

FIG. 15

| 1. | Base Product |
|---|---|

1.1 Source
Prospectus: 5/1/09 Metlife Preference Plus Select
Pages:
1.2 Class
*1.2.1 Summary*
This product offers B, C, L and bonus share classes.
*1.2.2 Surrender Charge*
*1.2.2.1 Schedule*

|  | Class | | | |
|---|---|---|---|---|
| Year | B | Bonus | C | L |
| 1 | 7.00% | 9.00% | 0.00% | 7.00% |
| 2 | 6.00% | 8.00% | 0.00% | 6.00% |
| 3 | 6.00% | 8.00% | 0.00% | 5.00% |
| 4 | 5.00% | 7.00% | 0.00% | 0.00% |
| 5 | 4.00% | 6.00% | 0.00% | 0.00% |
| 6 | 3.00% | 4.00% | 0.00% | 0.00% |
| 7 | 2.00% | 3.00% | 0.00% | 0.00% |
| 8'+ | 0.00% | 0.00% | 0.00% | 0.00% |

*1.2.2.2 Rules*
The policyholder can always withdraw earning without a charge. After the first contract year, the policy holder can also withdraw up to 10% of total premiums (that are subject to a surrender charge) without a charge and all premiums that are out of the surrender charge schedule
When calculating the surrender charge, assume that the policyholder first withdraws all free partial withdrawals (FPW) then withdraws the oldest premiums first (i.e. the ones with the smallest surrender charge).

*1.2.2.3 Formula*
Free Partial Withdrawals (FPW)

| Time | FPW |
|---|---|
| $0 \leq t < 1$ | $FPW_t = MAX \left[ AV_t - \sum_{t=0}^{T} premium_t, 0 \right]$<br>note: this only applies for initial premiums; any future premiums are not subject to this 1 year wait before withdrawing 10% premiums |
| $1 \leq t <$ end of surr. chg. period | $FPW_t = MAX \left[ AV_t - \sum_{t=0}^{T} premium_t, 0 \right] \sum premium_{outofsurrchgschedule}$<br>$\sum premium_{withsurrchgschedule} \cdot fpw\_rate$<br>Where fpw_rate = 10% |

Non Free Partial Withdrawal (NFPW):
$NFPW_t = MAX \left[ Withdrawal_{requested@t} - FPW_t, 0 \right]$
Surrender Charge (SC):

FIG. 19A $$SC_t = Min\ [premium_{oldestwsc}, NFPW_t, 0]\ surrchg_{oldestpremwsc}$$
$$+ Min\ [Premium_{nextoldest}, NFPW_t - premium_{year1}, 0]\ surrchg_{nextoldestprem}$$
$$... + Min\ [premium_{mostrecent}, NFPW_t - \sum_{t=oldest}^{2nd\ mostrecent} premium_t, 0]\ surrchg_{mostrecentprem}$$

note: this is a recursive formula, which illustrates the concept of first applying the surrender charge for the oldest premiums first, and then to the next oldest premium, etc. until all NFPW has been accounted for.

Withdrawal received (for partial withdrawal):
$$Withdrawal_{received@t} = Withdrawal_{requested@t} - SC_t$$

*Cash Surrender Value (CSV)*
$$CSV_t = AV_t - SC_t$$
where $withdrawal_{requested@t} = AV_t$

*This represents the amount the policyholder would receive on a full surrender*

1.2.3 Bonus Class
Bonus amount: 3% of premiums made in first year credited to the account value
The bonus credit is not applied to the guaranteed benefit base (i.e. the initial benefit base equals the premium, not the premium and the bonus).
Rules:
Cut-off purchase age: 81 (older of joint contract must be under 81)
Irrevocable
Enhanced Dollar Cost Averaging Program is not available with the bonus class
Fixed account rates may be lower for the bonus class than for other classes
Note that the 3% bonus is only applicable to premiums paid in the first year, while the higher M&E fee would be effected by premiums paid in subsequent years.

1.3 Fees
1.3.1 Summary
1.3.2 M&E & Admin Fees
Pay annually based on the average daily value of the amount in the separate account.
Note: they refer to these as separate account charges

| Class | B | Bonus | C | L |
|---|---|---|---|---|
| AV based Fee | 1.25% | Years 1-7: 1.70% Years 8+: 1.25% | 1.65% | 1.50% |

1.3.3 Annual Maintenance Fee (AMF)
AMF = $30
Timing: Deducted on each contract anniversary
AMF Waiver: Account Value (AV) >= $50,000
Will deduct on Full surrender

Fig. 19B 1.3.4 Fund Mgt Fee
*1.3.4.1 Max and Min Fees from previous year*

|  | Min | Max |
|---|---|---|
| Total Annual Operating Expenses End of Year (EOY) 2008 | 0.54% | 1.60% |

*1.3.4.2 Other Mgt Fees*
The following 4 American funds increase the M&E expenses by 20bps (basis points), in addition to their total operating expenses
American Funds Bond, American Funds Growth-Income, American Funds Growth, American Funds Global Small Capitalisation Division (?).

1.3.5 Living Benefit (LB) & Death Benefit (DB) Fees
*1.3.5.1 Optional Death Benefits:*

| Optional DB | AV based Fee |
|---|---|
| Optional Annual Step_Up Benefit | 0.20% |
| Optional Greater of Annual Step_Up or 5% Annual Increase Amount | 0.35% |
| Optional Earnings Preservation Benefit | 0.25% |

Note: These fees are calculated the same way as the M&E fee (add base M&E and DB fee together)

The fees for this death benefit are based on a benefit base
Enhanced Death Benefit:

| Issue Age | Death Benefit Based Fee | Maximum Fee |
|---|---|---|
| <=69 | 0.75% | 1.50% |
| 70-75 | 0.95% | 1.50% |

Fee deducted at the end of each contract year, prior to taking into account any optional ratchets.
May raise the fee is the optional ratchet is elected up to the lower of the current new business charge and the contract max.

*1.3.5.2 Optional Guaranteed Minimum Income Benefit (GMIB)*

|  | Benefit Based Fee | Maximum Fee |
|---|---|---|
| GMIB Plus II | NY: 0.95%<br>All other States: 1.00% | 1.50% |

Fee deducted at the end of each contract year, prior to taking into account any ratchets.
*1.3.5.3 Optional Guaranteed Lifetime Withdrawal Benefit (GLWB)*

FIG. 19C

Note: The company calls these benefits LWGB

|  | Current Benefit Based Fee | Maximum Fee |
|---|---|---|
| GLWB II (Single Life) | 1.25% | 1.60% |
| GLWB II (Joint Life) | 1.50% | 1.80% |

Fee is deducted at the end of each contract year after applying any Compounding Income Amount and prior to taking into account any Automatic Annual ratchets occurring on the Contract Anniversary.
The fee will remain in effect even if the benefit balance is zero.

*1.3.5.4 Optional Guaranteed Minimum Withdrawal Benefit (GMWB)*
Note: The company calls these benefits GWB

|  | Benefit Based Fee | Maximum Fee |
|---|---|---|
| Enhanced GMWB | 0.55% | 1.00% |

When the benefit balance hits zero, the rider will end and the fee will no longer apply.

1.3.6  Other

1.4  Investment Information
1.4.1  Restrictions
*1.4.1.1 Restricted Products*
LWGB II (=GLWB II)
GMIB Plus II
Enhanced DB
*1.4.1.2 Restrictions*
Summary:
Maximum Allocation is 70% Equity / 30% bonds with quarterly rebalancing.
Must allocate all money in either Plan A or Plan B
Plan A)  100% in one or more (Balanced / Moderate Allocation Fund of Funds): *In our opinion, these funds are probably no more than 60% equity*
- Fixed Account
- BlackRock Money Market Investment Division (where available)
- American Funds Balanced Allocation Investment Division
- American Funds Moderate Allocation Investment Division
- the MetLife Conservative Allocation Investment Division
- MetLife Conservative to Moderate Allocation Investment Division
- MetLife Moderate Allocation Investment Division
- SSgA Growth and Income ETF Investment Division Or
Plan B) Money allocated to the following restrictions

FIG. 19D

| Platform | Allocation Restriction |
|---|---|
| Platform 1 (Bonds) | At least 30% |
| Platform 2 (Large Cap / International) | Up to 70% |
| Platform 3 (Mid Cap) | Up to 15% |
| Platform 4 (Small Cap /Real Estate) | Up to 15% |

Rebalancing:
Plan B requires quarterly rebalancing.

Platform 1 (Bonds)
- American Funds Bond
- Barclays Capital Aggregate Bond Index
- BlackRock Bond Income
- PIMCO Inflation Protection Bond
- PIMCO Total Return
- Western Asset Management U.S. Government

Platform 2 (Equity)
- American Funds Growth
- Lord Abbett Bond Debenture
- American Funds Growth-Income
- Met/Franklin Income
- Artio International Stock
- Met/Franklin Mutual Shares
- BlackRock Diversified
- Met/Templeton Growth
- BlackRock Large Cap Core
- MetLife Stock Index
- BlackRock Large Cap Value
- MFS® Research International
- BlackRock Legacy Large Cap Growth
- MFS® Total Return
- Davis Venture Value
- MFS® Value
- FI Value Leaders
- Morgan Stanley EAFE ® Index
- Harris Oakmark International
- Oppenheimer Capital Appreciation
- Janus Forty
- Oppenheimer Global Equity
- Jennison Growth
- T. Rowe Price Large Cap Growth
- Legg Mason Partners Aggressive Growth
- Western Asset Management Strategic Bond Opportunities
- Legg Mason Value Equity

Fig. 19E

- 
Platform 3 (Mid Cap)
- BlackRock Aggressive Growth
- FI Mid Cap Opportunities
- Lazard Mid Cap
- Met/Artisan Mid Cap Value
- MetLife Mid Cap Stock Index
- 
- Neuberger Berman Mid Cap Value
- T. Rowe Price Mid Cap Growth

Platform 4 (Small Cap / Real Estate)
- American Funds Global Small Capitalization
- BlackRock Strategic Value
- Clarion Global Real Estate
- Loomis Sayles Small Cap Core
- Loomis Sayles Small Cap Growth
- Met/AIM Small Cap Growth
- Russell 2000® Index
- RCM Technology
- T. Rowe Price Small Cap Growth

1.5    Age and Money Restrictions

1.5.1    Money Restrictions

| Class | B | Bonus | C | L |
|---|---|---|---|---|
| Minimum Initial Premium | Non-Qualified: $5,000<br>IRA / SEP: $2,000 | $10,000 | $25,000 | $25,000 |
| Minimum Ongoing Premiums | $500 | $500 | $500 | $500 |
| Total Premiums | $1,000,000.00 | $1,000,000 | $1,000,000 | $1,000,000 |
| Minimum Balance after withdrawal to avoid full surrender | $2,000 | $2,000 | $2,000 | $2,000 |
| Initial Debit Authorisation | Non-Qualified: $50<br>IRA / SEP: $100 | $10,000 | $25,000 | $25,000 |
| Subsequent Debit Authorisation | $100.00 | $100 | $100 | $100 |

FIG. 19F 1.5.2 Age Restrictions

|  | B | Bonus | C | L |
|---|---|---|---|---|
| Cut Off Issue Age | 86 | 81 | 86 | 86 |
| Cut Off Ongoing Premium Age | 91 Massachusetts: 89 | 91 Massachusetts: 89 | 91 | 91 |

1.6 Cash Flows – Order of Operations
Quarterly Rebalance (allocation B of restricted benefits)

AV based fees deducted throughout year in the net growth rate
AMF deducted at contract anniversary (before Benefit fees and ratchets – Confirm)

Benefit Base fees deducted on contract anniversary – the exact logic may be different from each product
Beginning of Year
1)   net fund growth for 3 months
2)   rebalance (optional)
3)   Repeat Until End of Year
Anniversary
deduct AMF
Calc Benefit specific fees and bases

2.   Death Benefits
2.1   Annual Step-Up Death Benefit
2.1.1   Source
Prospectus:
Page:
2.1.2   Summary
The Death Benefit is the greater of annual ratchets and the account value. Premiums increase the ratchet on a dollar for dollar basis. Withdrawals decrease the ratchet pro-rata.
2.1.3   Restrictions
Cut-off purchase age = 80
2.1.4   Availability
Available for variable annuity (VA) purchased after 4/30/03 for an additional charge
2.1.5   Charge Basis:
Account Value
2.1.6   Formula
annual_step_up_death_benefit = Max [1,2]
1 = AV
2 = annual ratchet

FIG. 19G

Ratchet Formula:

| Event | Description | Formula |
|---|---|---|
| Initialise | Set to initial deposit | $Ratchet_{initialize} = initial premium$ |
| Ongoing premiums | Increase ratchet $\$$ | $Ratchet_t = ratchet_{previous} + premium_t$ |
| withdrawal | Reduce pro rata by reduction in AV | $Ratchet_{postwithdrawal} = ratchet_{prewithdrawal} \times \left[1 - \dfrac{withdrawal^{**}}{av_{prewithdrawal}}\right]$ |
| Each Anniversary prior to cut off age | Ratchet if AV is higher than current MAV | $Ratchet_t = MAX\left[ratchet_{previous}, AV_t\right]$ |

**Note: withdrawal includes any surrender charge penalty:
withdrawal = withdrawal paid to policyholder + surrender charge 2.1.7 Parameters
Cut off ratchet age = 81
Cut off purchase age = 80

2.2 DB Template
2.2.1 Source
Prospectus:
Pages:
2.2.2 Summary
2.2.3 Restrictions
2.2.4 Availability
2.2.5 Charge Basis:
2.2.6 Formula
2.2.7 Parameters
2.2.8 Ambiguous points and assumptions:
2.2.9 Prospectus Errors / Issues:

3. GWB

3.1 Lifetime Withdrawal Guarantee II (LWG II) = GLWB
3.1.1 Source
Prospectus:
pages:
3.1.2 Summary:
This product is a GMWB / GLWB hybrid. If the policyholder takes their first withdrawal prior to age 59.5, then the guarantee is a GMWB where the guaranteed payments end once the guaranteed balance is paid out. If the first withdrawal is made on or after age 59.5, then the guarantee is a GLWB, where the policyholder will receive lifetime income if they abide by the product's withdrawal rules.
The policyholder receives a 7.25% compounding deferral bonus on the 1st 10 contract anniversaries. The policyholder is allowed to make 1 withdrawal during this period and not lose the bonus. In addition, the policy has an annual ratchet that stays in effect through the policyholder's age 90 anniversary.
The policyholder is allowed to cancel the benefit on anniversaries: 5, 10, and then annually starting at the 15th anniversary. If the policyholder chooses to cancel the benefit on or after the 15th anniversary AND the account value is less than the premiums paid during the 1$^{st}$ 120 days, then the policyholder may be eligible to receive a guaranteed principal adjustment (if positive). This adjustment would be applied to the policyholder's account value. The adjustment is calculated as all premiums paid through the 1$^{st}$ 120 days since inception, reduced pro rata for all withdrawals, less the account value at cancellation.
Additional premiums increase the benefit dollar for dollar.
All withdrawals decrease the balance pro rata and if the sum of withdrawals in any year are greater than the guaranteed withdrawal amount, these withdrawals reduce the base pro rata.
The product is available for both single and joint life.

3.1.3 Restrictions
Washington State: The GPA is not available.
New York:
- Lower joint life withdrawal amounts
- Deferral bonus amount has more restrictive and less generous criteria including:
  ○ 6% bonus
  ○ starts on age 63 anniv. (single life) or age 66 anniv. (for joint – where the age refers to the younger of the joint owners)
  ○ Bonus ends at the earlier of:
- 5 years
- 1$^{st}$ withdrawal There are certain investment restrictions. See investment restrictions section above
Must elect at issue
Cannot elect with Enhanced Death Benefit (or any other living benefits)

3.1.4 Availability
Available for purchase on new contracts issued on or after 5/4/09

3.1.5 Charge
If a ratchet occurs, the company may increase the charge to the then current charge for the same optional benefit, but no more than the max charges.
Basis: Benefit Base
Frequency: annually
The charge is deducted at the end of each contract year after applying any deferral bonus and prior to taking into account any ratchet.

3.1.6 Joint Life Availability
Availability: Yes
Difference from single policy: Price
For New York, there is also a lower withdrawal rate; change of the primary beneficiary will terminate the LWG II rider
Restrictions:
Must elect at issue. The oldest (joint) owner must be age 85 or younger at issue. Spouse must be primary beneficiary and elects to continue and is at least age 59.5 at continuation to receive the GLWB. If younger than age 59.5, then will receive the GMWB variation.
A purchaser who has or is contemplating a civil union would not be able to receive continued payments upon the death of the owner under the joint life version.

3.1.7 Order of Operations:
Anniversary
1. Bonus
2. Rider Charge
Ratchet 3.1.8 Formula:

FIG. 19i

*3.1.8.1 Benefit Base and Benefit Balance (Total Guaranteed Withdrawal Amount and Remaining Guaranteed Withdrawal Amount))*

| Event | Description | Formula |
|---|---|---|
| Initialise | Set to initial deposit | $base_{initialize} = initialpremium$<br>$balance_{initialize} = initialpremium$ |
| Ongoing premiums | Increase base & balance $4$ | $base_t = MAX[base_{prepremium} + premium_t, maxbase]$<br>$balance_t = MAX[balance_{prepremium} + premium_t, maxbalance]$ |
| Non-excess withdrawal | Benefit base is not effected; balance is reduced $4$ | $base_t = base_{prewxn-excesswithdrawal}$<br>$balance_t = balance_{prewxn-excesswithdr} - withdrawal**_t$ |
| Excess withdrawal | Reduce base and balance pro rata by reduction in AV | $base_t = base_{prewithdrawal} \times \left[1 - \dfrac{withdrawal_t}{av_{prewithdrawal}}\right]$<br>$balance_t = balance_{prewithdrawal} \times \left[1 - \dfrac{withdrawal_t}{av_{prewithdrawal}}\right]$<br><br>*Note: if the excess withdrawal causes the AV to hit zero, the guarantee is terminated.*<br>*If there are several withdrawals that occur during the year and say the 1$^{st}$ withdrawal is a non-excess withdrawal, but after the 2$^{nd}$ withdrawal the total withdrawals exceed the limit. The first withdrawal would have been treated as a non-excess withdrawal (as above) but the 2$^{nd}$ withdrawal amount would be treated as an excess withdrawal and the numerator in the pro rata formula would be the amount of the second withdrawal.* |
| Bonus: paid on each anniversary until earlier of: 1) date of max withdrawal number 2) after the max anniversary | If satisfy criteria, pay bonus. Note that this occurs prior to the ratchet calculation | $base_{anniv} = base_{prebonus} \times [1 + bonusrate]$<br>$balance_{anniv} = balance_{prebonus} \times [1 + bonusrate]$<br>Subject to max base and balance<br>Note: if the 2$^{nd}$ withdrawal takes place during the 1$^{st}$ contract year, than no bonus is credited.<br>The maximum number of bonus credits is 10, with the 10$^{th}$ being credited on the 10$^{th}$ contract anniversary (assuming no more than one withdrawal has been made up to this point).<br>New York only: has different parameters and more restrictions |
| Each Anniversary prior to cut off ratchet age | Ratchet if AV is higher than Base/balance after Bonus | $base_{anniv} = MAX[base_{postbonus}, AV_{postbonus\ \&fees}, maxbase]$<br>$balance_{anniv} = MAX[balance_{postbonus}, AV_{postbonus\ \&fees}, maxbalance]$<br>Where AV anniv is after any rider fees have been deducted |

FIG. 19J

Notes:
**withdrawal includes any applicable surrender charges

*3.1.8.2 Withdrawals*
The withdrawal amount is recalculated after the benefit base / balance has changed due to premiums, excess withdrawals, bonuses and ratchets.
An excess withdrawal occurs if the sum of withdrawals in a given year are greater than the guaranteed withdrawal amount (defined below). Note that the withdrawal does not include any surrender charge for this calculation.

$$excess\ withdrawal : \sum_{t>prev\ anniv}^{next\ anniv} withdrawal_t > guaranteed\ withdrawal\ amount$$

$$non-excess\ withdrawal : \sum_{t>prev\ anniv}^{next\ anniv} withdrawal_t \leq guaranteed\ withdrawal\ amount$$

If the policyholder's account value hits zero due to an excess withdrawal, the guarantee is terminated.

*3.1.8.3 Annual Ratchet (Automatic Annual Step -Up)*
Occurs automatically on each contract anniversary prior to ratchet cutoff age.
Ratchet the base and balance up to the account value, if higher than existing base and balance, after any bonus credits and rider charges (subject to the max base and balance).
Upon a ratchet, the company has the option to reset the benefit charge. The reset charge cannot be higher than the lessor of the current rate for new contracts and maximum charges as defined at issue.
This fee would not be applied until the following anniversary.
The policyholder has the option to decline the ratchet in order to avoid an increase in charge. Under this circumstance, the benefit base and balance would not be increased. Please see the prospectus for more details on declining an automatic ratchet (page 88).

*3.1.8.4 Guaranteed Withdrawal Amount (annual benefit payment)*

$$guaranteed withdrawal amount_t = base_t \times guaranteed withdrawal rate$$

Where:
Guaranteed withdrawal rate is as follows:

| Age of first withdrawal | Guaranteed withdrawal rate | Guarantee type |
|---|---|---|
| age<59.5 | 5.00% | GMWB |
| 59.5 <= age <76 | 5.00% | GLWB |
| age >=76 | 6.00% | GLWB |

FIG. 19K

New York Only
For Joint Life, the withdrawal rate is lower.
Note: Age refers to younger of joint owners

| Age of first withdrawal | Guaranteed withdrawal rate | Guarantee type |
|---|---|---|
| Age<59.5 | 4.50% | GMWB |
| 59.5 <= age <63 | 4.50% | GLWB |
| Age >=63 | 5.00% | GLWB |

Recall that if the first withdrawal occurs prior to age 59.5, the product is defined as a GMWB that runs out once the benefit balance has been depleted. Otherwise, the policy is a GLWB.

*3.1.8.5 Guaranteed Principal Adjustment*
The policyholder is allowed to cancel the benefit on the contract anniversary every 5th contract anniversary for the first 15 anniversaries and then on every anniversary thereafter.
If the policyholder cancels the benefit on the 15$^{th}$ or later anniversary, the company will add a Guaranteed Principal Adjustment to the policyholder's account value (Not available in Washington State).

$$guaranteedprincipaladjustment_{cancel} = MAX \left[ \sum_{t=0}^{120/365} premium_t \prod_{allwithdrawal} \left[ 1 - \frac{withdrawal}{av_{prewithdrawal}} \right] - av_{precancel}, 0 \right]$$

The adjustment represents all premiums paid during the first 120 days of the contract, reduced pro rata for any withdrawals and reduced for the account value at the time of cancellation. The adjustment can never be less than zero.
Note that the withdrawals include any withdrawal charges

*3.1.8.6 Alternative Death Benefits*
In addition to the default or any elected optional death benefits, this benefit also offers two additional death benefit options at no additional fee:
1) Return of Premium Death Benefit (4 $ withdrawal reductions) only available if no excess withdrawals have been made $$LWGIIDeathBenefit = \sum_{t=1}^{T} [premium_t - withdrawal_t]$$

2) The remaining benefit Balance (aka remaining GWA) can be paid out as a death benefit, where the guaranteed withdrawal amount would be paid out each year. The frequency of payments can range from monthly to annually. If the beneficiary dies during this payout phase, the benefit will continue to their estate.
The annual payout may be accelerated if the contract is a non-qualified contract in order to satisfy section 72(s) of the Internal Revenue Code. Notably, the duration of the balance payout cannot exceed the remaining life expectancy of the payee under the appropriate IRS tables. If the payee is a non-natural person, the balance must be paid out within 5 years from the date of death. Payments under this death benefit must begin within 12 months following the date of death.

*3.1.8.7 Termination*
The benefit can terminate for a number of reasons, in which the policyholder may still have the base product. The possible ways the product can terminate and the repercussions are as follows:
Note that when the contract is terminated, a pro-rata portion of charge will be assessed.

FIG. 19L

| Reason for Termination | Result | Model command |
| --- | --- | --- |
| annuitize | AV is charged a pro-rata portion of fees and taxes, then annuitized. | Calculate payout annuity |
| Non-excess withdrawal that depletes AV or reduces AV such that the full rider charge can not be paid. | Still receive remainder of GMWB / GLWB, but can no longer add premiums. "will have no other benefits under the contract" | Continue modelling guarantee payments |
| Excess withdrawal that depletes AV | The policyholder does not receive any future guarantee payments | End guarantee |
| Policyholder Elects to cancel benefit on $5^{th}$ or $10^{th}$ anniversary | The guarantee stops along with the rider charge. The policyholder still maintains the base contract. | End guarantee |
| Policyholder Elects to cancel benefit on $15^{th}$ or later anniversary | The guarantee stops along with the rider charge. The guarantee principal adjustment is triggered. The policyholder maintains the base contract. | Calculate guarantee principal adjustment. Then end guarantee. |
| Death (for single life version) | Pay death benefit | Death benefit is paid. End guarantee. |

3.1.9  Other Contract Information
At any time during the pay in phase, the policyholder may elect to annuitize under current annuity rates. If the policyholder chooses to take less than the guaranteed withdrawal amount, they are not entitled to make it up in subsequent years.

*3.1.9.1 GMWB details*
Company will pay guaranteed withdrawal amount each year until the benefit balance is depleted (even if account value declines to zero).

*3.1.9.2 GLWB details*
Company will pay guaranteed withdrawal amount each year for the rest of the policyholder's life (and the life of their spouse if the joint life version was selected and all criteria have been met).

*3.1.9.3 Required Minimum Distribution (RMD)*
RMD Friendly:  yes
notes:
For IRAs and other contracts subject to Section 401(a)(9) of the IRS code, the policyholder may be required to take withdrawals to fulfil minimum distribution requirements, generally beginning at age 70.5. These payments could be larger than the guaranteed withdrawal amount. If the policyholder enrols in the automated required minimum distribution service, after the first contract year, the company will increase the guaranteed withdrawal amount to equal the most recently calculated RMD amount, if such amount is greater.

3.1.10  Parameters:
Cut off purchase age = 86
min GLWB withdrawal age = 59.5
    *else policy is GMWB*
bonus rate = 7.25%

FIG. 19M max bonus duration = 10
max bonus withdrawal = 1 (# withdrawals permitted before lose bonus)

min bonus start age = 0
NY only
    bonus_rate = 6%
    max bonus duration = 5
    max bonus withdrawal = 0
    min bonus start age single = 63
    min bonus start age joint = 66
        where age refers to younger of joint owners cut off ratchet age = 91
    For joint p/h in NY, it refers to the younger owner
min GPA duration = 15
GLB cancellation dur. sched. = 5, 10, 15+
max GPA premium payment dur = 120/365
    *premiums paid from 0 to this time are counted in the GPA calculation* max base = 10,000,000
max balance = 10,000,000
withdrawal_schedule:
    withdrawal age<76 = 5%
    withdrawal age >=76 = 6%

Joint Life:
GLB rider chg = 0.85%
max GLB rider chg = 1.55%
GLB rider chg basis = benefit base
cut off max joint issue age = 86
min joint continuation GLWB withdrawal age = 59.5
    *else policy is GMWB*

3.2    LB Template
3.2.1    Source
Prospectus:
Pages:
3.2.2    Summary
3.2.3    Restrictions
3.2.4    Availability
3.2.5    Charge Basis:
3.2.6    Joint Life Availability
3.2.7    Order of Operations
3.2.8    Formula
3.2.9    Parameters
3.2.10  Other Contract Information
3.2.11  Ambiguous points and assumptions:
3.2.12  Prospectus Errors / Issues:

FIG. 19N

SYSTEM AND METHOD FOR EVALUATION AND COMPARISON OF VARIABLE ANNUITY PRODUCTS

CROSS-REFERENCES TO RELATED APPLICATIONS

This application claims benefit of the following patent application(s) which is/are hereby incorporated by reference: U.S. Provisional Application No. 61/250,062, filed Oct. 9, 2009.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to analytical systems and methods used by financial advisors and individual investors. More specifically, the present invention pertains to systems and methods for valuing and comparing variable annuity products and associated guaranteed living benefit rider features.

Historically, variable annuity products have been sold as tax sheltered mutual fund type investments that gave the owner the option to annuitize, i.e. convert a lump sum account value into a fixed (typically) stream of payments that would (typically) last until the death of the owner or last joint owner.

More recently, innovative optional contract add-ons known as guaranteed living benefit (GLB) riders were introduced. These GLBs are now the primary driver of sales of variable annuity products. A popular type of GLB rider, known as a Guaranteed Lifetime Withdrawal Benefit (GLWB), is elected by a high percentage of annuity customers who are offered the option.

There are four general types of guaranteed living benefit riders: (1) Guaranteed Lifetime Withdrawal Benefits (GLWB) which provides a guaranteed minimum benefit that is accessed through withdrawals and is active for as long as the owner (joint owner) is alive; (2) Guaranteed Minimum Accumulation Benefits (GMAB), which provides a guaranteed minimum benefit that is paid out as a lump sum at the end of a deferral period; Guaranteed Minimum Income Benefit (GMIB) that provides a guaranteed minimum benefit that is accessed when the owner annuitizes, typically at pre-set annuitization rates; and (4) Guaranteed Minimum Withdrawal Benefit (GMWB) in which a guaranteed minimum benefit is accessed through withdrawals and terminates when the benefit balance reaches zero.

While each type of GLB rider is different, a concept common to each is that they offer the owner a guaranteed floor on their equity investment. Therefore, the guaranteed "benefit base" will never decline in value, regardless of how underlying sub-account assets (e.g. mutual fund type assets) perform, further assuming that the contract rules are not breached. The two most popular types of GLBs (GLWB, GMIB) also offer a longevity guarantee which allows the owner to withdraw a certain amount of money from the contract each year for as long as they are alive. This guarantee applies regardless of the value of underlying assets (even if they go to zero, again assuming that the owner follows the rules of the contract).

To increase market share, some variable annuity companies have innovated other features to differentiate their GLB riders from competitors. These GLB rider features can generally be classified as Deferral Bonuses, Benefit Base Ratchets, Guaranteed Withdrawal Amount Ratchets, Benefit Base Roll-ups, and Income Storage.

These features essentially implement different mechanisms to increase the guaranteed floor, thus increasing the guaranteed income payout. However, each variable annuity company has its own rules and restrictions on how these features work. Therefore, it becomes very challenging to compare the value propositions of the competing products.

FIG. 1 illustrates shows how the performance of a variable annuity is typically presented in a conventional prospectus. The graph in FIG. 1 is reproduced from page 94 of a MetLife® Preference Plus Select® variable annuity prospectus dated May 1, 2009, the content of which is incorporated herein by reference.

FIG. 1 shows how the guaranteed "annual benefit payments" 104, "cumulative withdrawals" 106, and "account balance" 108 of this variable annuity with a guaranteed lifetime withdrawal benefit might vary over time. The terms used in FIG. 1 may be proprietary to this product are not necessarily industry standard terminology.

The graph in FIG. 1 assumes that the variable annuity initially has $100,000 in its account at year 0 and that the account balance earns a static, deterministic rate of return. In this illustration, it is further assumed that the owner elects to begin taking withdrawals immediately. Under this scenario, the annuity rider provides guaranteed annual benefits payments of $5,000 per year to the annuitant (e.g. person who purchases the annuity), which stays constant over time.

If the annuitant lives for 20 years after purchase (e.g. age 85 if the annuity is purchased at age 65), then a total of $100,000 in cumulative withdrawals will be paid. If the annuitant lives longer, then more will be paid but if the annuitant lives for a shorter period, then less will be paid in the form of a guaranteed living benefit.

Each year, the amount of the account balance is decreased by the amount of the annual benefit payment plus fees that the insurance company charges. The fees are charged to cover the costs (including profit) of managing the account and of providing account guarantees. Over time, the amount that an annuitant may electively withdraw outside of the guaranteed annual benefits decreases. The ability of the annuitant to withdraw a guaranteed annual benefit each year while the annuitant is alive, regardless of the value of the account balance running to zero, is referred to as a "guaranteed living benefit."

The amount of money that the annuitant may electively withdraw may be decreased by a "surrender charge". Surrender charges may be significant in the first few years of an annuity and may decrease thereafter.

The annuity may also allow the annuitant to specify a beneficiary to whom at least a portion of the account balance might be paid if the annuitant dies before the account balance goes to zero. This is referred to as a Guaranteed Minimum Death Benefit (GMDB). A GMDB may function in a manner similar to the living benefit, because it guarantees a minimum payout, regardless of market performance, with mechanisms to increase over time. However, the payout is contingent on the death of the contract owner.

The account balance may be invested according to the direction of the annuitant but subject to terms and conditions of the annuity. Thus, the account balance may increase or decrease depending upon the performance of the investment.

There are costs associated with providing different features in an annuity. These costs are reflected in fees which vary with the features selected by the annuitant.

A full description of the terms and conditions associated with a variable annuity are described in a prospectus. While all of the information that describes most variable annuity products is publicly available in detailed prospectus literature, it is extremely difficult and time consuming to understand the product details. There are several reasons for this. First, a prospectus may be written by one or more lawyers, and therefore uses language that is difficult for a financial advisor and individual investor to understand. Second, there is no industry-standard vocabulary to describe the common and generic features of these products. Instead, each company uses its own vocabulary when describing its products in both its prospectus and other marketing literature. This adds to the confusion and frustration when a person tries to compare competing products and the basic language used to describe the common features of the products are different. Third, a typical prospectus is lengthy. The terms and conditions may be very complex and require hundreds of pages to describe.

The difficulty in comparing different variable annuities is further compounded by the large number of funds in which the annuitant may invest his/her account balance. For example, FIG. 2 lists a portion of the funds available for a typical MetLife annuity along with descriptions of investment objectives of each fund. FIG. 3 illustrates how these funds have performed historically along with the different fees associated with each fund.

To properly understand the value proposition for different variable annuities and their GLB riders, a number of components must be considered, and understood how they can change over time. These components include Total Fees, Cash Surrender Value, Benefit Base, Guaranteed Withdrawal Amount, Investment Options and Restrictions, Death Benefit, Issuing Company Financial Strength, and Product Flexibility & Restrictions Referring again to the graph in FIG. 1, much information about the product is not conveyed. A static graph as shown cannot illustrate how the account value might change under different economic scenarios. This can have a significant impact on a purchasing decision.

Annuity product information that is publicly available is not sufficient for answering the fundamental question: Which product offers the best value for an investor, given their unique circumstances? There are several important flaws in relying on just the published product information.

First, variable annuity products are dynamic in nature. Because of the many interconnected variables, it is a mistake to attempt to determine the best product for an individual by looking at a description of features and separately evaluating each individual component. Rather, it is necessary to evaluation the product as a whole.

Second, simply comparing product features is not appropriate in determining the best value for a given investor, as this incorrectly implies a static, one size fits all approach. In reality, the value proposition of a given annuity product is relative to the prospective owner and his/her unique circumstances. The individual parameters and circumstances that may need to be considered include demographic characteristics (e.g. age, sex, health, spouse), owner preferences (investment allocation, low fees vs. richer guaranteed floors, bequest motive) and owner behavior (when to begin withdrawal, when to annuitize, decision to lapse).

Third, the relative value of one product over another ultimately depends on the scenario path played out. A "scenario" is how the investments will perform in the future. While the exact scenario is unknown when purchased, product descriptions would not provide adequate information on how competing products would fair under different scenarios.

Another problem lies in how one could reduce the universe of variable annuity products with certain features into a short list and then study and compare these products in more detailed format. This leads to situations where advisors make this decision based on reasons that are not necessarily in the best interest of their clients, such as their personal relationship with the insurance company wholesalers, soft incentives, as well as which companies pay the highest commissions.

Thus, there is a need for an effective way to understand the value proposition and compare different variable annuities. More specifically, there is a clear need for a dynamic product comparison and decision making engine—a tool which considers the unique circumstances of the investor, models the competing products in a consistent framework that captures all of the key dynamics of the products, and illustrates the output in a easy to understand format and dynamic.

BRIEF SUMMARY OF THE INVENTION

In one embodiment, the present invention is a computer system that includes hardware and software modules that are specifically adapted and functional to forecast the expected performance of different variable annuities and riders. The forecasts provided by the system are subject to the preferences, demographic details, and expected behavior of the user of the system under a range of economic scenarios. In one embodiment, the behavior of an annuity is coded into the system based on an expert (e.g. a certified actuary) interpretation of the conditions and limitations specified in the annuity prospectus. The performance forecast may be based on Monte Carlo simulations of the selected funds. The Monte Carlo simulation may further be based on validated reference scenarios available from certified sources. The output of the simulation is based on a set of cash flows for each simulated product.

In an embodiment, the output of the system, along with quantitative product information, may be presented to the system user in two phases. The first phase may present the user a customized aggregate score for each product being considered. This score may be broken down into a plurality (e.g., nine or more) component scores. This scoring allows the user to narrow down his/her list of potential products.

A second phase may provide the user with an interactive set of graphs that let the user dynamically compare multiple (e.g., two or more) products and illustrate how all the key cash flows would look under various scenarios and owner behavior assumptions. This allows the user to "look under the hood" and see how the products compare on a logical, normalized basis.

In one embodiment, one graphical output from the system may be a bar chart in which bars representing the cash surrender value (or alternatively account value or death benefit) are superimposed on or over displayed bars representing cumulative withdrawals from the product. This allows a user to clearly see how the total annuity value (money received plus money available at a given time) varies over time for different annuities under different scenarios. The user is then in a position to make a more confident and better informed decision on which annuity will best serve his/her needs.

In an embodiment, the system output may use a consistent language set to discuss the features of different products, thereby reducing the confusion that comes with each company inventing their own lexicon to describe the same features.

The system and method of the present invention provides functionality to benefit users who are deciding which variable annuity to purchase as well as helping individuals who are contemplating trading in an existing annuity for a new product. In the latter case, the model can compare the existing product to new products.

BRIEF DESCRIPTION OF THE SEVERAL VIEWS OF THE DRAWINGS

Figure 2:
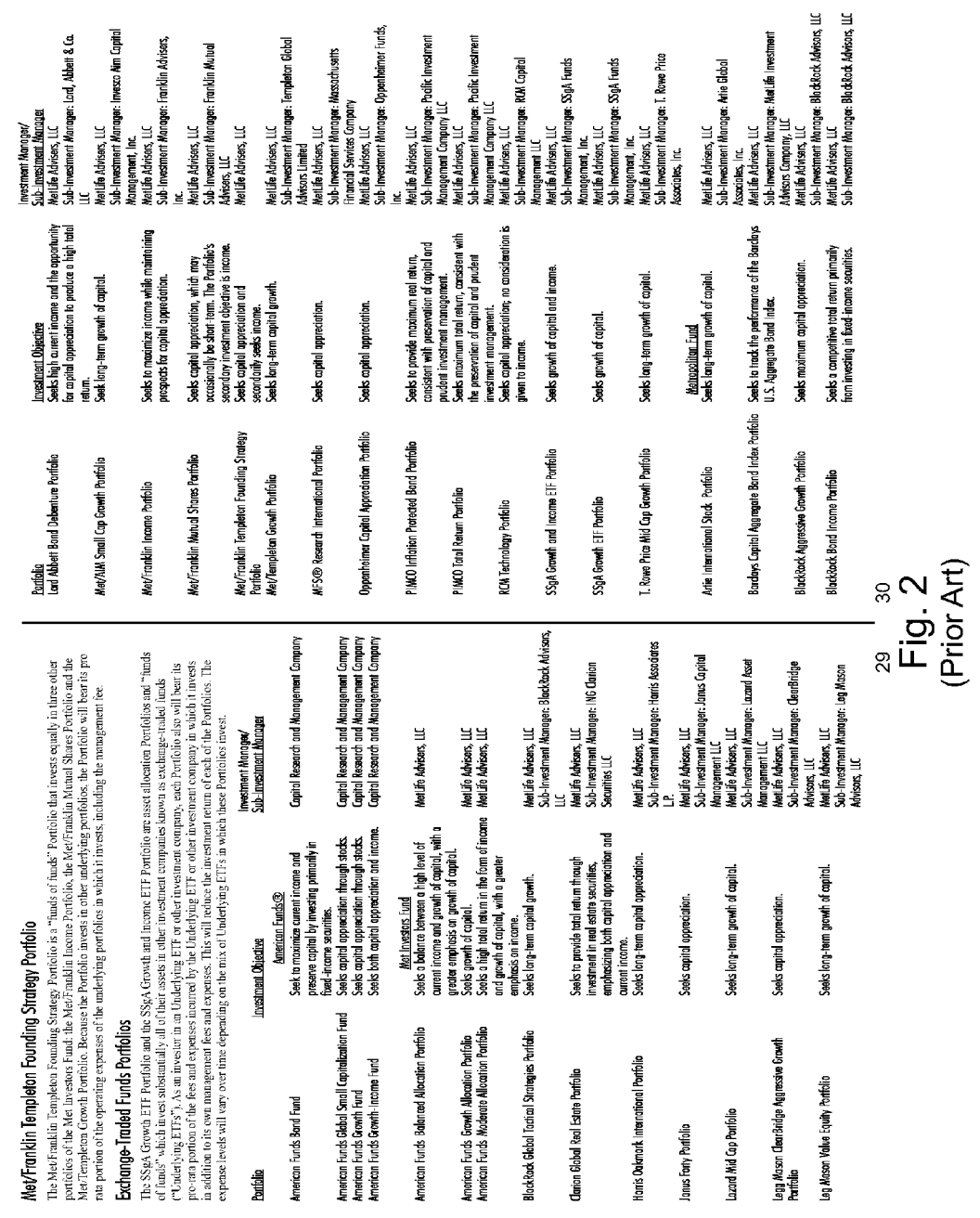

FIG. 2 illustrates how a variety of different investment funds are presented in a prospectus for selection with a typical annuity product.

FIG. 3 illustrates how historical performance for investments funds available for a typical annuity is reported in a prospectus.

FIG. 5 illustrates a comparison between generic terms used to describe an annuity with brand specific terms used in a typical product prospectus.

FIG. 15 illustrates suitable market proxies for investment funds of a given asset class.

FIGS. 19A-19N represent one embodiment of a product specification template that may be used with the system and method of the present invention.

DETAILED DESCRIPTION OF THE INVENTION

The following detailed description discloses various embodiments and features of the invention. These embodiments and features are meant to be exemplary and not limiting.

Figure 1:
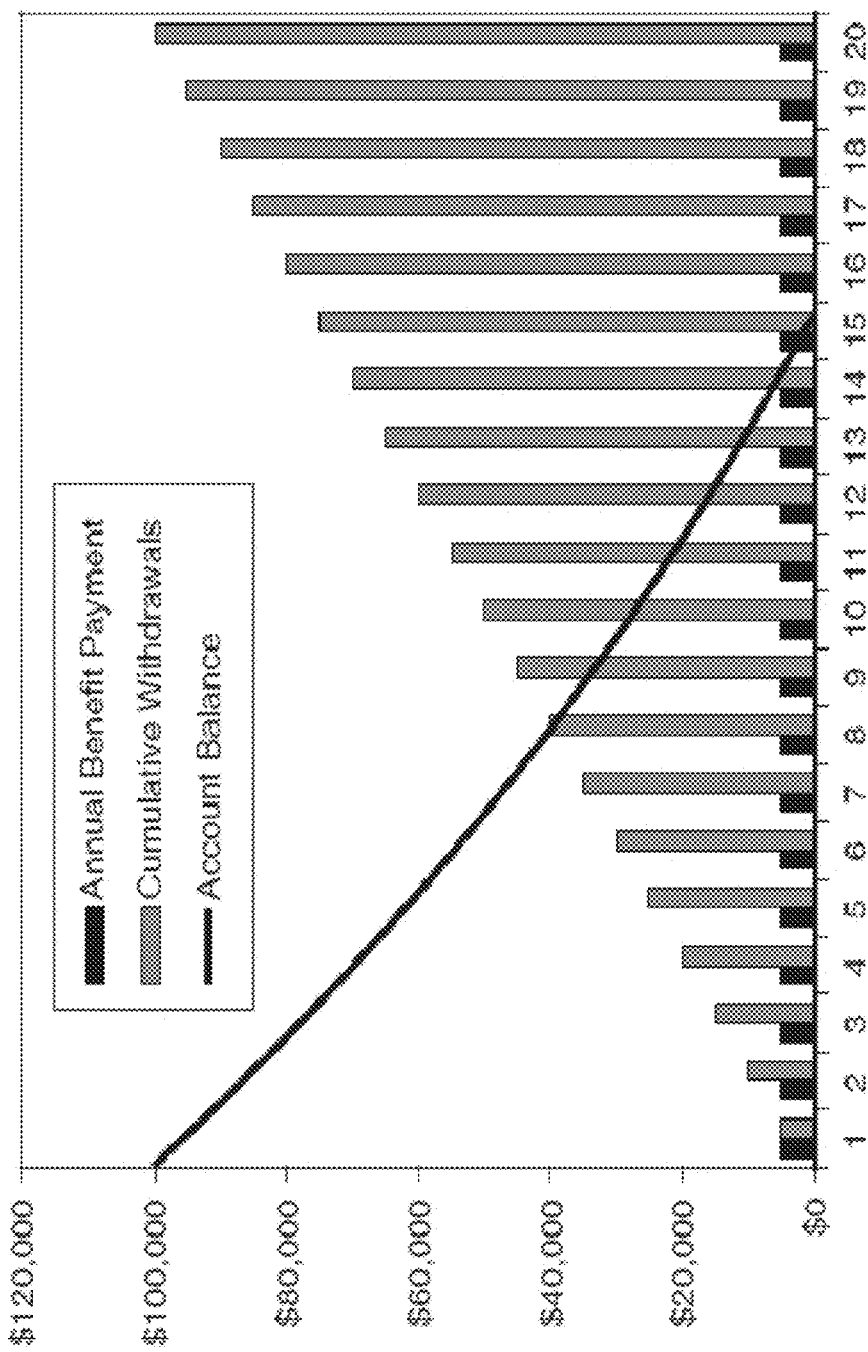
FIG. 1 is a graph that conventionally illustrates performance over time for a typical variable annuity product.
Figure 4:
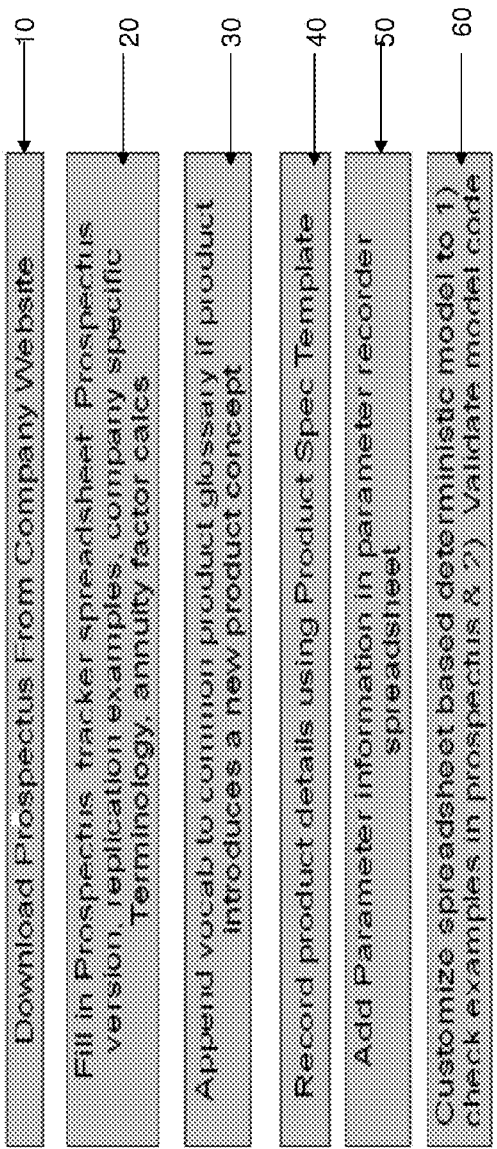
FIG. 4 illustrates an embodiment of a method for creating an annuity specification based on a prospectus description, in accordance with one aspect of the present invention.

In one embodiment, the present invention includes a method for generating specifications for annuity product based on a prospectus description of that product. One embodiment of this product specification process is illustrated in FIG. 4. In a first step 10 the user downloads or otherwise acquires an annuity prospectus from an insurance company web site. In a next step 20, the user completes a prospectus tracking data form, such as a spreadsheet, to record a prospectus issue date, general product information, and any amendments made to the prospectus from the original filing. In one embodiment, the general product information recorded in the prospectus tracking data form or spreadsheet may include replication examples, company-specific product terminology, and annuity factor calculations.

In a third step 30, the user appends new vocabulary to a common product glossary if the prospectus describes a new product concept.

In this embodiment, a fourth step 40 includes recording product details using a product specification template. The user then, in a fifth step 50, adds parameter information to a parameter record data form spreadsheet. In a sixth step 60, the system user customizes a pre-existing product data form or spreadsheet based on a deterministic model of annuity performance so that examples in the product prospectus and/or other sources can be checked and model code can be validated.

The goal of the product specification process is to translate the information found in the prospectus into a form that can be readily used by a coder to program a model of the annuity into a computer system and then tested. Furthermore, it is meant to keep clear records of activities performed for each product as well as maintain a current glossary encompassing terms to describe all key annuity features.

One embodiment of a completed product specification template is described in FIGS. 19A-N. This embodiment of a template has been completed for a portion of the MetLife Preference Plus Select annuity product as of May 1, 2009. The numerically labeled outline section headers (e.g. "1.1 Source", "1.2.1 Summary", etc.) represent template sections that may substantially common to all annuities. The text presented within a header (e.g. "This product offers B, C, L and bonus share classes") represents specific descriptions of the annuity product as found in the prospectus. In some embodiments, the initial pages of the template will contain a title page and a template table of contents.

In accordance with one aspect of the present invention, the behavior of an annuity may be modeled in a product model using a product modeling process. Annuity behavior may be described in part using equations such as:

$$RatchetBase_t = Max(RatchetBase_{t-1}, AV_t)$$

wherein conditions and definitions of parameters are presented accordingly.

In addition to using equations, conditional statements may also be presented textually in a product model. One example of conditional statement text is ad follows:

A Fee is deducted at the end of each contract year after applying any Compounding Income Amount and prior to taking into account any Automatic Annual ratchets occurring on the Contract Anniversary. The fee will remain in effect even if the benefit balance is zero.

Thus, in one embodiment, a coder may take this conditional statement text input and further translate it into the computer code adapted for use in the system of the present invention.

Annuity product models may be updated on a continuous basis, as existing products are updated and new products are filed by the insurers. The stochastic scenarios used in the simulation may be updated on a periodic basis that can range from daily to annually.

FIG. 5 shows generic terms that may be used with the present invention to describe an annuity product and compares them with brand-specific terms used in a prospectus for a specific company, such as the MetLife product shown. This comparison helps a model coder use the proper parameters in developing a model for each annuity product. Different insurers use different terms to describe the same concept for different products. The generic terminology uses the same vocabulary, regardless of which product it is describing.

Figure 6:
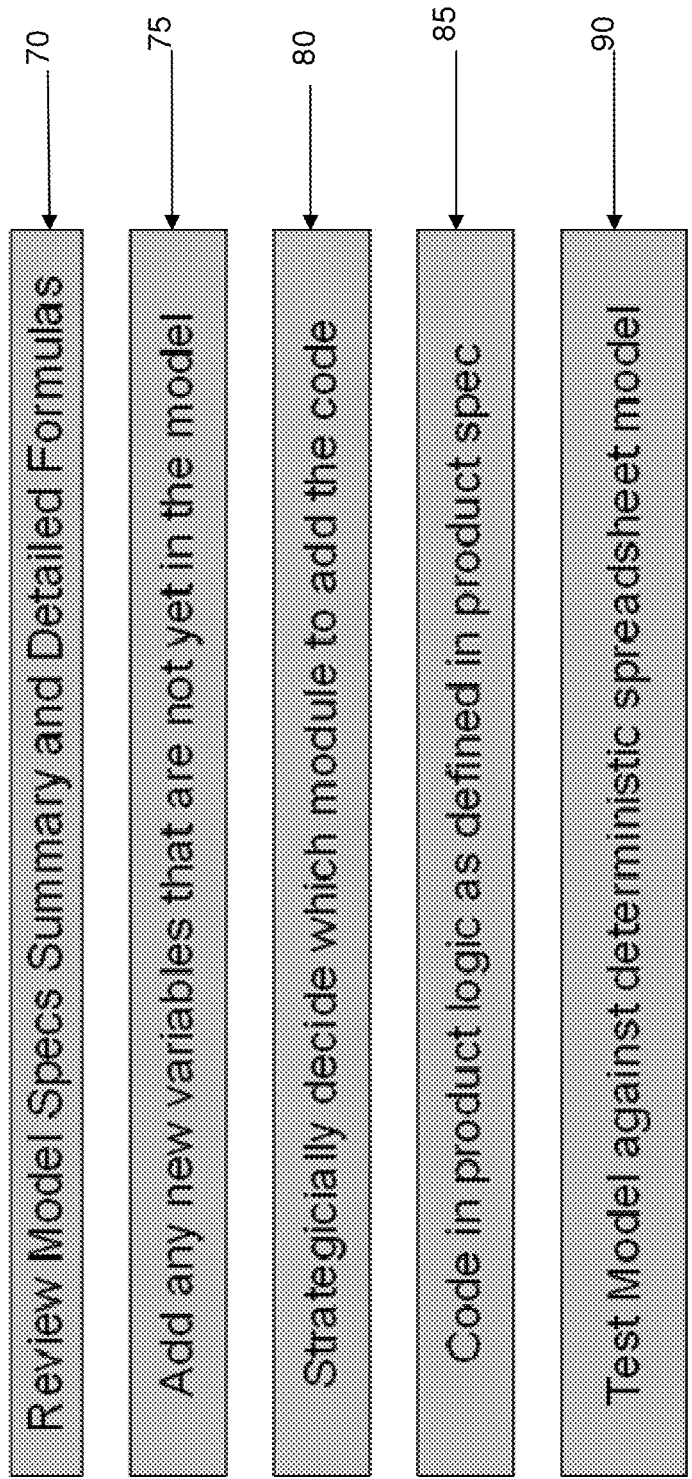
FIG. 6 illustrates an embodiment of a model coding process, in accordance with one aspect of the present invention.

FIG. 6 illustrates steps in one embodiment of a model coding process that may be used in the present invention. The steps may include reviewing the model specifications summary and detailed formulas 70, adding new variables that are not yet in the model where necessary 75, strategically deciding the most efficient way to modify the code 80, coding the product logic as defined in the annuity product specification 85 (i.e. the model specification template specific to the product), and testing the model against the deterministic spreadsheet model 90.

Testing the product model against a deterministic spreadsheet model helps identify possible errors in the modeling process and well as possible errors in the prospectus itself. Errors discovered in the prospectus can be brought to the attention of the insurance company.

In one embodiment, a deterministic model is one where the output is defined by the parameter settings and the input. An investment fund that had a guaranteed interest rate, for example, would have deterministic behavior.

A deterministic model may be contrasted with a stochastic model. In a stochastic model, the output is determined in part by one or more random numbers or processes. The output, therefore, can vary from one run to the next. However, while the output varies, the results can be replicated by knowing how the random component was seeded.

Deterministic examples are often presented in a product prospectus to illustrate the behavior of an annuity. These can be used to check model code because the output is uniquely determined by the input. Any difference between a deterministic example in a prospectus and the output generated by the model would indicate an error in either the model or the prospectus.

The model may also be tested by running the model repeatedly while changing one incremental variable. The model results may then be viewed in a graphical format, which can highlight errors by showing a spike in an otherwise smooth curve. For example, the model may be run for a given product, keeping all variables and assumptions constant except for changing the starting age of the owner incrementally from one run to the next. When plotting the key output, most errors would be readily apparent to someone of ordinary skill in the art.

Figure 7:
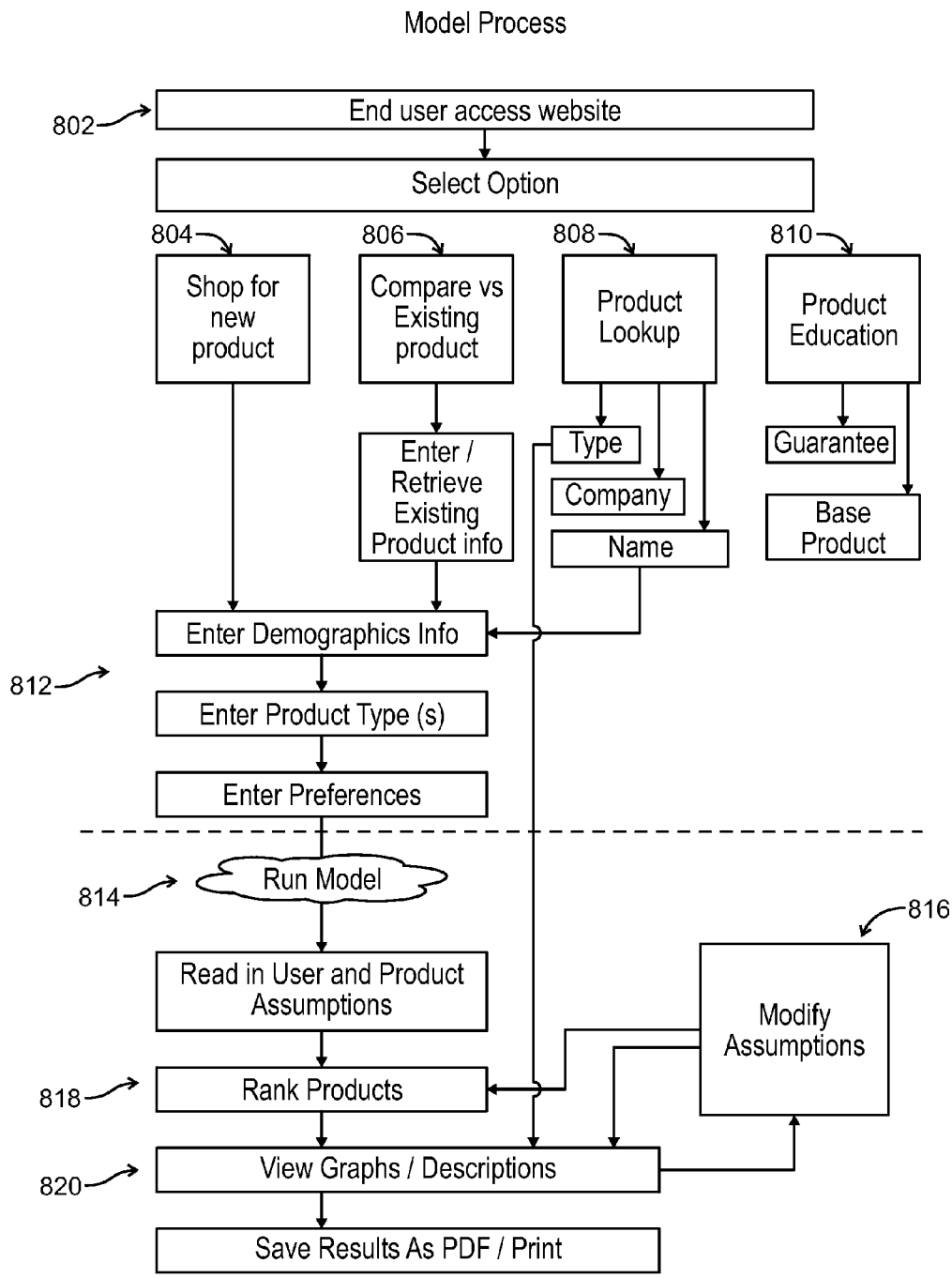
FIG. 7 is a flow chart illustrating a product modeling process in accordance with one embodiment of the present invention, whereby a user is presented with comparative performance data for one or more annuities based on user preferences.

FIG. 7 generally illustrates one embodiment of a product modeling process whereby a user (e.g. an end user) is presented with comparative performance for one or more annuity products based on user preferences and demographic information. The user may access the computer system 802 running the model on a secure website through a workstation via a LAN, WAN or public network such as the Internet. As shown on FIG. 18. In some cases, the user may download a version of the software to run off-line on the user's machine. Once the user sets all the assumptions and clicks to run the model, the model process will begin.

Thus, in one embodiment, an initial phase of product modelling process may include the following steps:
 (a) Read in and compile all user inputs;
 (b) Determine the calculations that need to be completed;
 (c) Determine which subset of products that will be compared;
 (d) Determine a length of time for which the model will need to be projected;
 (e) Determine a type of output the user desires to see in the results;
 (f) Read in all necessary product, actuarial, and scenario inputs; and
 (g) Send each model process run to a unique system server (e.g., a cloud server) that will carry out that specific model run and return the data.

In a second phase of the product modelling process, the server and system software may be configured and coded to run the product models as follows:
 (a) Initiate all variables in the product model;
 (b) Use a statistical simulation process (e.g., a Monte Carlo simulation process as further described below) to simulate the value of each cash flow item for each product over the life of each product for each scenario;
 (c) Record each key variable for each product at each point in time;
 (d) Use the actuarial present value of each key cash flow along with pre-determined qualitative ratings to calculate a rating score for each rating criteria;
 (e) Normalize the scores where necessary, e.g., between 0-10 (or 0-100); and
 (f) Output the model to the user on a system output device, such as a display.

After the model run(s) has finished and the results have been compiled and presented to the user, the system may be configured to visually illustrate a subset of products for a given scenario. The user may then refine one or more assumptions and rerun the model as necessary. The results may be saved in the system and/or exported to a PDF or other file.

In one embodiment, a product model may use a Monte Carlo process to simulate the economic market, a product owner's decisions to the market, and ultimately, the value of the components that determine the payout of the owner's annuity and guaranteed benefits. While simulations of detailed product cash flows are dependent on characteristics of a given product, they can be described at a high level and configured as follows:
 (1) Project equity, bond and interest rates for a time step;
 (2) Calculate the net return of each fund in a portfolio;
 (3) Increase the policyholder's account value;
 (4) Rebalance the separate accounts if required;
 (5) If the owner chooses to withdraw or deposit money, adjust the account value, benefit base, and benefit balance accordingly for each product, while abiding by contract rules;
 (6) Deduct non-fund based product fees such as the annual maintenance fee and rider fees, typically at the end of the year;
 (7) If the product requires the owner to annuitize, determine the annuity payout when the owner elects to annuitize.
 (8) On selected contract anniversaries, perform guarantee calculations, which may include one or more of ratchet calculations, roll-up calculations, reset calculations, bonus calculations, and rider fee calculations.

Certain product variables may be exported from the Monte Carlo simulations for use in the product modeling process. These variables may include account value, cash surrender value, withdrawals, total fees, benefit base for both living and death benefits (total and split by sub-components, such as ratchet, roll-up, etc.), benefit balance, gross returns, and net returns.

As shown in FIG. 7, a user may use the product modeling process either to shop for new products 804, compare an existing product to new products 806 (for product trade-in purposes), research a specific product 808, or obtain general product education 810. These options are discussed in more detail below.

After the user has identified an existing product or a specific new product, the user may access the same user interface screen 812. At this point in the process, the user would enter demographic information, desired product types, and product and behavioral preferences. The model is now run 814 by simultaneously emulating each product on a different processor. The model outputs expected annuity performance 818 (discussed in more detail below). The user may either modify their assumptions 816 and re-run the model, or move on to dynamically compare a subset of annuity products through interactive cash flow graphs 820 (also discussed in more below).

Alternatively, the user may access the product education section 810 of the system software. In this section, the user can watch videos to obtain instruction on how to use the software, look up terms in the glossary, and use an interactive graph to compare a user-created generic annuity. System users can establish their preferences by viewing graphs of two versions of a generic product. They would start with a base generic product and then compare it against a similar product, but with one feature modified. The user would then select which version of the feature they prefer by viewing the cash flows (e.g. income, cash surrender value, fees, etc) over a several contrasting economic scenarios (e.g. a "good," "average" and "bad" scenario). These preferences would be recorded in the user's profile. The user may then search to find the closest real products that resemble the user-created product.

If the user selects the "Shop for a New Product" option when running the product modeling process, the user may enter and/or edit several sets of information and preferences. This information is used to calibrate the model algorithm and find a customized solution for the end user as well as customize the graphical depictions of the products. After all the information is input, the model is run, and a series of outputs can be accessed by the user. More detailed information about user inputs for the product modeling process is described below.

The first set of outputs ranks the products by several fields, taking into account the user's inputs. The user may save or export to the outputs to a PDF file or vary some of the inputs to see how that would change the results. In addition, the user may move on to a direct comparison of several of the products they select. For this option, the user would select a subset of products and the type of economic scenario in which they will be compared against.

This option may bring up a user interface screen that displays a chart and a description of each key product characteristic. A subsequent user interface screen may illustrate each of the product cash flows on a set of graphs, to show exactly how they compare on a logical basis.

From this point, the user may be presented with several options: (1) modify assumptions and/or the economic scenario; (2) save or export the model output to a PDF or other file; (3) change products; (5) return to algorithm rankings; and (5) finish. If the end user is an individual investor, the user is presented a user interface screen to request contact by a financial advisor. By this election, the user would agree to have the user-input information saved and available for access by the financial advisor. The user may then meet with the financial advisor to review model results and further refine the user preferences. More information about the user interface for the product modeling process is described below. Alternatively, the user may select to buy online. In this case, the user would be presented with a purchase form which, upon completion, would be submitted directly to the insurer for processing.

When running the product modeling as shown in FIG. 7, four sets of inputs may be required: end user inputs, product inputs, actuarial inputs, and scenario file inputs. Various embodiments of these different input sets are discussed in more detail below.

The system may maintain user interest by minimizing the amount of user inputs initially required. Therefore, in one embodiment of the invention, a minimum number of user inputs will be required when the product modeling process begins. Default settings for a number of the other inputs may be provided that the user may refine at a later point in process.

The step 812 of entering user inputs for the product modeling process may include entering demographic data for the product owner/policyholder, user product preferences, and the expected use and/or income requirements for the annuity product.

Figure 8:
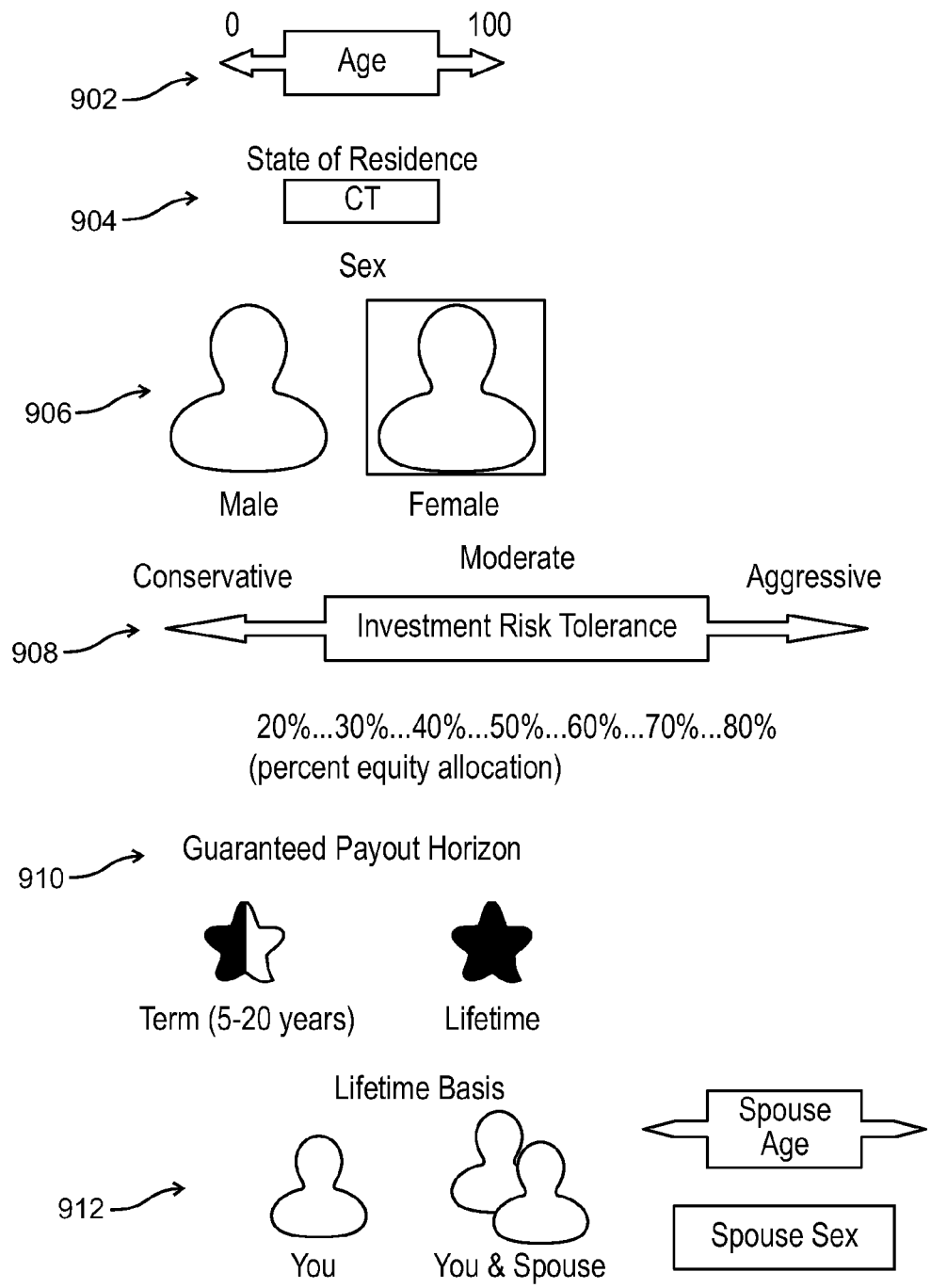
FIG. 8 illustrates a first aspect of a system user interface where a user would enter basic demographic, behavioral, and preference information for use a product modeling process.
Figure 9:
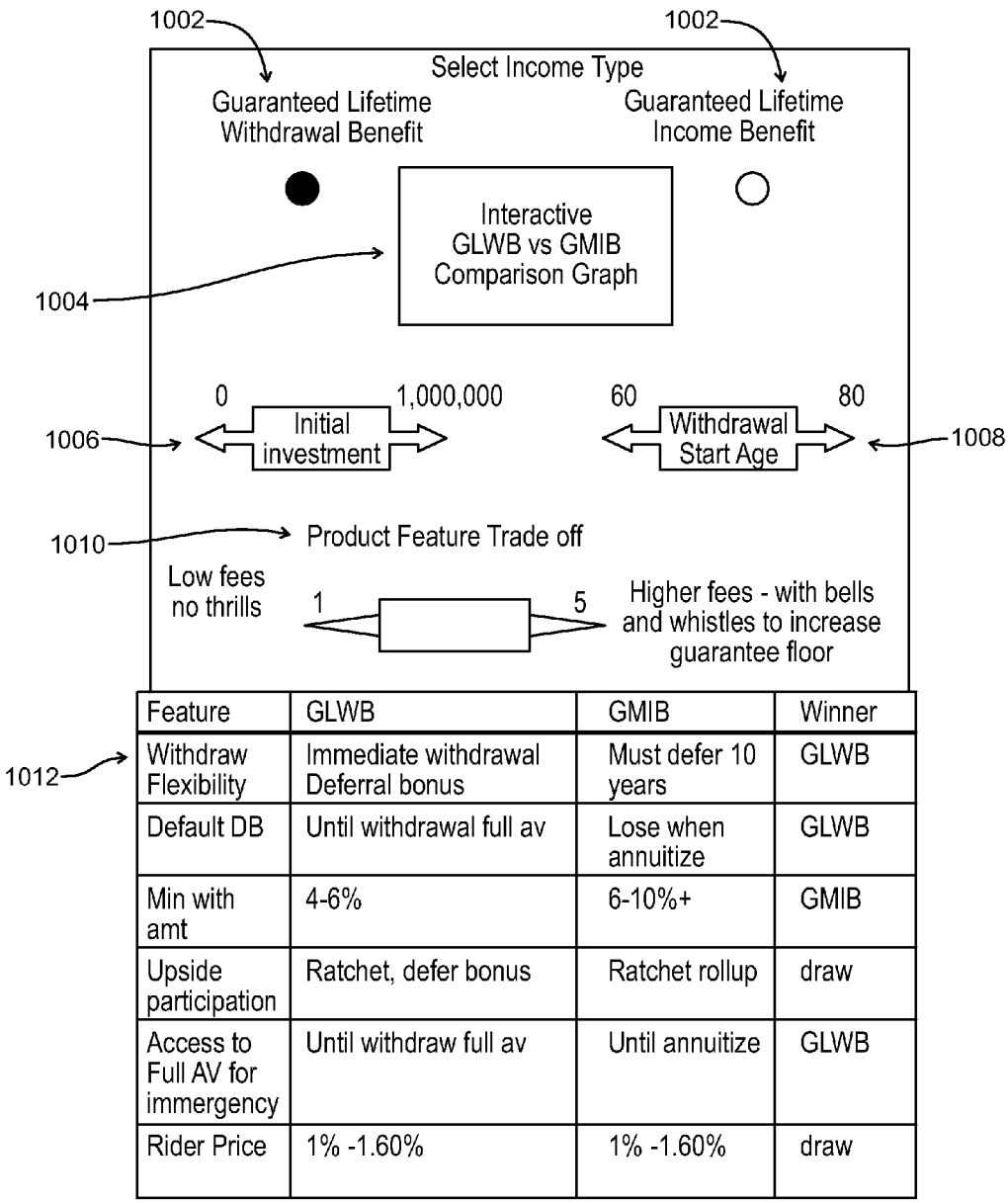
FIG. 9 illustrates a second aspect of a system user interface where a user would enter basic demographic, behavioral, and preference information for use a product modeling process.

The initial demographic information may be input into the system by presenting a user interface containing a combination of sliding bars, drop down menus and image maps. One embodiment of such an interface is shown in FIGS. 8 and 9. The demographic information selections may include age 902 and investment risk tolerance 908 by sliding bars, state of residence via a drop down box, and sex 906, payout horizon 910 and single/joint product (or not sure) 912 by radio button. The user may also select a primary reason for purchase (living benefit, death benefit, tax deferral, other).

The user input step 812 for the product modeling process may further include entering the user's initial product preferences. In one embodiment of the system, the initial product preference selections may include: (a) initial investment amount 1006; (b) product type(s) such as GLWB, GMWB, GMIB, GMAB, GMDB 1012 or prompt to answer questions to help determine which product is best suited for the user; (c) importance of lifetime income 910; (d) when the product owner needs to start taking income 1008; (d) importance of a death benefit to payout to heirs upon death; and (e) access to investment in case of emergency.

The user input step 812 for the product modeling process may further include the entering the user's initial income preferences. In one embodiment, the user may be presented with a sliding scale to input preferences (i.e. 0-10 ranking), or leave at default setting. The initial income preference options may include (a) Higher Guaranteed Floor vs. Higher Account Value Growth (lower fees); (b) defer income withdrawal for 5%+bonus for up to 5-10 years; (c) investment profile, e.g., aggressive vs. conservative while showing investment fees associated with choice; minimum company rating, showing a number of companies per rating cut-off; (d) base product fee vs. surrender charge schedule; and (e) health status, e.g., life expectancy.

The user input step 812 in the product modeling process may include advanced settings to allow the user to vary and customize different assumptions used in the product model. Table A below lists demographic variables that may be adjusted by the user and corresponding default settings that may be coded into the model.

TABLE A

| Variable | Default Setting |
|---|---|
| Policy start date | Today's date |
| Joint life indicator | no |
| Primary Policyholder First Name | |
| Primary Policyholder Last Name | |
| Primary Policyholder Sex | male |
| Primary Policyholder Date of Birth | Jan. 1, 1950 |
| Primary Policyholder Health (life expectancy) (0 = below ave; 10 = above ave) | 5 |
| Joint Policyholder First Name | |
| Joint Policyholder Last Name | |
| Joint Policyholder Sex | Female |
| Joint Policyholder Date of Birth | Jan. 1, 1950 |
| Joint Policyholder Health (life expectancy) (0 = below ave; 10 = above ave) | 5 |
| State of Residence | CA |
| Tax Basis of Investment (Qualified / Non-Qualified) | Non-Qualified |
| Annuitization Tax | 0 |
| Federal Tax | 25% |
| State Tax | 9.3% |

Table B below lists product benefit preference variables that may be adjusted by the user and corresponding default settings that may be coded into the model.

TABLE B

| Variable | Default Setting |
|---|---|
| Investment Allocation (Currently set as equity/bond allocation, but may change to more advanced portfolio options in future | 60% Equity/40% Bond |
| Investment Fees | Default based on equity bond composition |
| (Annual) Rebalancing indicator | no |
| Base Product Type (a, b, bonus, c, 1 share products) | B share |
| GMIB Preference 0-10 | 0 |
| GLWB Preference 0-10 | 10 |
| GMWB Preference 0-10 | 0 |
| GMAB Preference 0-10 | 0 |
| GMDB type 1 preference 0-10 | 10 |
| GMDB type 2 preference 0-10 | 0 |
| GMDB type 3 preference 0-10 | 0 |
| GMDB type 4 preference 0-10 | 0 |
| GMDB type 5 preference 0-10 | 0 |
| Minimum Company Rating (0-10) | 8 |
| Company X Indicator (for each company, yes or no) | |
| GMIB Guaranteed Annuitization Factor | \<table based on age\> |

Table C below lists product feature preference variables that may be adjusted by the user and corresponding default settings that may be coded into the model.

TABLE C

| Variable | Default Setting |
|---|---|
| Product Flexibility (0-10) | 5 |
| Fees (0-10) | 5 |
| Fund Allocation restrictions (0-10) | 5 |
| Fund Choice (0-10) | 5 |
| Withdrawal penalty (0-10) | 5 |
| Deferral (0-10) | 5 |

TABLE C-continued

| Variable | Default Setting |
|---|---|
| DB Importance (0-10) | 5 |
| Guarantee richness (0-10) | 5 |
| Time horizon (years: 1-99) | 30 |

In one embodiment, product inputs may be entered into the system using product input files, after the model is initially run 814. Product input files may be created to summarize relevant product assumptions and parameters. These parameters may be set by an expert, such as a certified actuary after reading and interpreting the prospectus for a given annuity product. In an embodiment, the parameters cannot be modified by the end user.

The product input files may be created and input as .txt or .csv type files. The relevant product assumptions that are part of the information contained in the product input files may include product fees, fund allocations limits, rebalancing frequency, guaranteed withdrawal percentage by age, rollup features, ratchet features, bonus features, death benefit features, guarantee caps, age restrictions, duration restrictions, forced deferral periods, and excess withdrawal penalties.

Actuarial assumptions and inputs may also be entered into the system as part of the product modeling process. The actuarial assumptions may be input as tables that include the appropriate male, female and joint mortality tables as selected by a mortality table expert, such as a certified actuary or life underwriter. In addition to a base table, certain mortality improvements, multipliers and age setbacks may also be specified as appropriate, such as when adjusted a base set of mortality rates for an above or below average health individual.

Certain annuity products give explicit instructions as to the "guaranteed annuity factors" used. In these cases, those annuity factors are included in the assumption inputs.

The actuarial inputs may also include dynamic lapse, withdrawal, and utilization or annuitization assumption parameters. These are dynamic parameters, in that these behavior assumptions are dependent on the ratio of the present value of future guarantee payments to the account value.

Several types of scenarios may be used and uploaded to the system for use in the product modeling process. These may include stochastic "real world" scenarios, stochastic risk neutral scenarios, deterministic scenarios, and historical scenarios. The stochastic scenarios may be market consistent scenarios. The real world scenarios may include a risk premium component, whereas the risk neutral scenarios are grown at the risk free rate, as documented in financial mathematical literature such as Options, Futures, and Other Derivatives by John C. Hull (2006).

The format of the scenarios may include a scenario number and a time step (e.g., daily, weekly, monthly, quarterly, semi-annual or annual). The scenario formats may further include fund returns, fund price, index or net asset value levels for each of the funds modeled. These funds may include equity and bond indices or individual securities.

The format of the scenarios may further include a term structure of risk-free forward interest rates for each economy being modeled. This may include a short term rate, 1, 3, 6, 9 month rates, and 1-50 year interest rates where appropriate interpolation/extrapolation techniques may be applied where liquid instruments are not available for a quote. These rates may be derived from a variety of sources, such as swap rates, government bond rates or other "risk-free" investments.

The format of the scenarios may further include a term structure of market volatility rates for each equity being modeled. This may include a short term rate, 1, 3, 6, 9 month rates, and 1-50 years of volatility rates where appropriate interpolation/extrapolation techniques may be applied where liquid instruments are not available for a quote. These rates may be derived from a variety of sources, such as bank and other industry quotes, historical analysis, and other industry data and publications.

The format of the scenarios may also include country exchange rates and/or inflation rates for all economies being modeled.

The scenarios may be generated outside the model and input as a .txt or .csv file. Alternatively, the model may contain its own economic scenario generator (ESG) that may calculate deterministic or stochastic equity volatility, interest rates, interest rate volatility, exchange rate volatility, inflation and other necessary parameters to output the necessary scenario file, as defined above. In the case of an internal ESG, additional inputs may be necessary, such as equity risk premiums, bond duration interest rate short rate, drift component, (short term) volatility, exchange rate volatility, etc. that is necessary in calibrating the appropriate ESG.

FIGS. 8 and 9 illustrate one embodiment of a user interface that may be generated by the system and used as part of the product modeling process. Referring to FIG. 8, a user would enter their age 902 and investment tolerance 908 via sliding bars. They would enter their state of residence 904 via a drop down box. They would also select their sex 906, payout horizon 910, and preference for a single vs. joint product 912 via radio buttons.

After the user demographic and preference data is submitted, the system would generate and display a next screen of the user interface as shown in FIG. 9. The content displayed in FIG. 9 is dynamic, in that it depends on the selection of the guaranteed payout horizon 910. In this example, it is assumed that the user entered a lifetime guaranteed payout horizon. This information populates FIG. 9 with a choice between a GMIB and GLWB benefit 1002. Otherwise, the display would be populated with options between non-lifetime guarantee: GMWB and GMAB benefits. In the user interface of FIG. 9, the user may select an initial investment amount 1006 and starting age to begin withdrawals 1008 with slider bars. In addition, a slider bar may be used to enter a product feature trade-off preference 1010 on a sale from 1 to 5, where 5 represents a product with richer guarantee features vs. a setting of 1 that represents a product with low fees.

The graph 1004 displayed in the user interface of FIG. 9 compares key cash flows associated with generic GLWB and a GMIB product. As the user updates selections, the graph updates in real time. The graph 1004 and the summary table 1012 help the user to decide on a preference between a GMIB and a GLWB product. However, if the user can't make a decision, the model can run comparing both types of products.

In another, abbreviated embodiment of a user interface that may be generated, a user is prompted to enter their age, their initial investment amount, and the age in which they will begin withdrawals. All other assumptions would be pre-populated, and can be modified by the user at a later step.

The user demographic and preference data collected as summarized in FIGS. 8 and 9, or the abbreviated set of data discussed above, provide enough information to run the model and create a customized product ranking. However, there are additional assumptions that a user may further adjust so that the model results are further customized to the user's circumstances. These adjustable assumptions may include: preferences regarding a death benefit; having money available for emergency purposes; importance of having product flexibility and control over selecting investment funds; and company financial strength. These assumptions may be set to a default setting, but can be modified by the user, as desired.

In one embodiment, a user may run a product model with basic assumptions. After the user views the results, the user may set up a meeting with a financial advisor. The financial advisor may access the initial assumptions as inputted by the user and ask further questions to better tailor the results to the user's circumstances, thereby adding value to the process.

Figure 10:
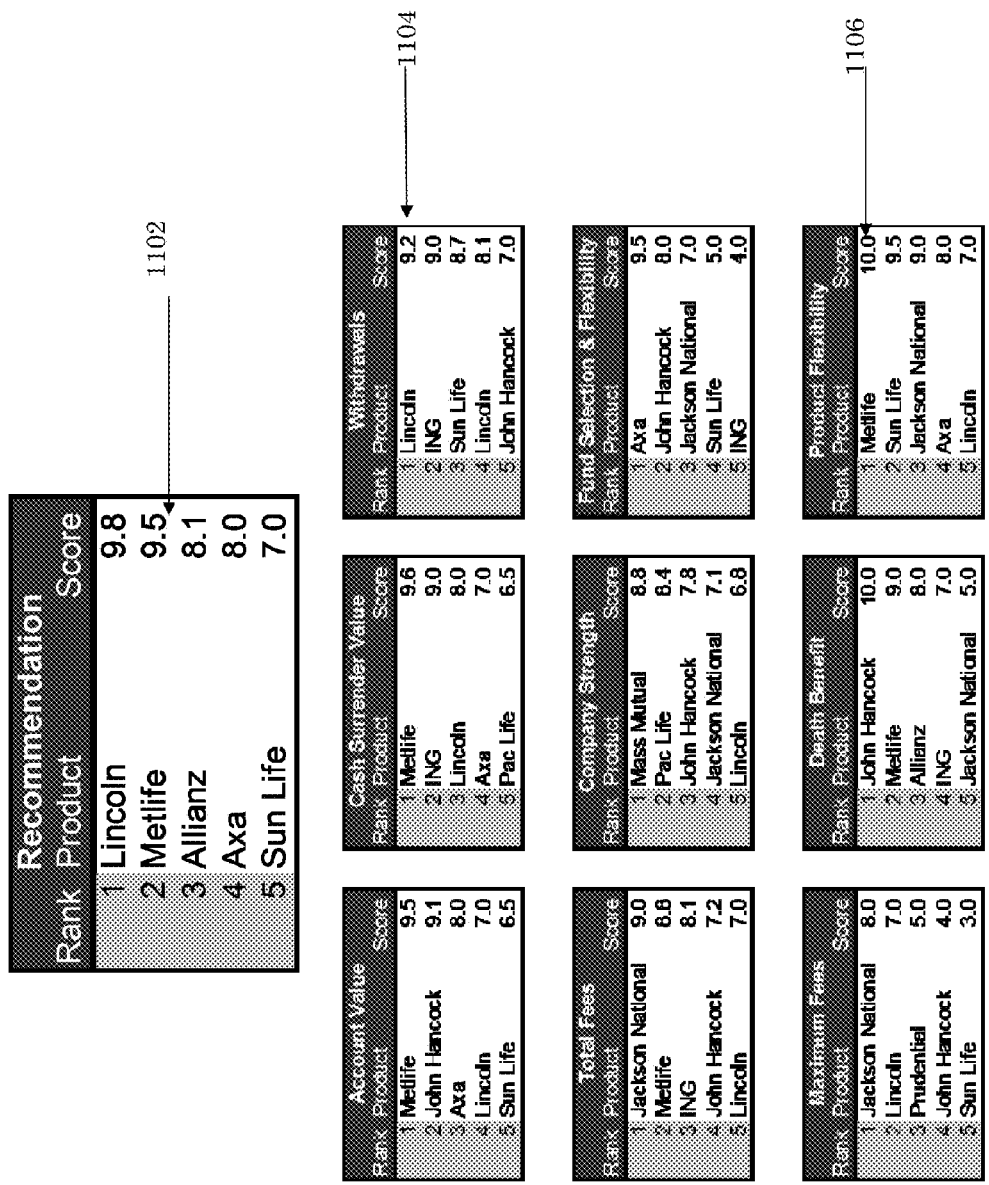
FIG. 10 presents exemplary output tables used to rank annuities according to user preferences.

FIG. 10 presents exemplary output tables used in the product modeling process to rank annuities according to user preferences and demographic information discussed above. Different available annuity products may be assigned a score based on a weighted average of the different user inputs. Both quantitative and qualitative information may be used in ranking the products. For some rating categories, product ranking scores may be generated purely from an actuarial present value of a given product cash flow (e.g. the account value over time) produced by a stochastic Monte Carlo simulation, and then normalized to create a score from 0 to 10 (or 0 to 100). For other fields, scores may be assigned to different aspects of the product, such as company strength which is derived from various rating agencies or other credible sources. A field such as fund selection and flexibility would require more judgment. However, this judgment may be based on pre-set guidelines to ensure consistency. One example of a pre-set guideline is that a company must offer at least 50 funds to achieve a score of x.

In one embodiment, each product that is modelled can be ranked in a number of quantitative and qualitative fields. As shown in the tables on FIG. 10, certain quantitative fields may be calculated directly from the model and include Account Value, Cash Surrender Value, Withdrawals, Death Benefit, and Total Fees.

Other aspects of the product may be more qualitatively evaluated and ranked. These include product flexibility (revocability and partial bonus if revoked, company rating (via S&P, Moody's, etc.), Fund selection (number and breadth of funds), maximum fee levels, customer service (e.g., does the company warn customers before incurring a withdrawal penalty), forced fund allocations, major or minor withdrawal penalties, and product transparency (absence of loophole or sneaky provisions).

For each of the fields selected by the user, the products may be ranked by their respective scores. The scores may be presented on a scale of 0 to 100 (or 0 to 10). The qualitative fields may be ranked by expert opinion after thoroughly reviewing all information, and in some cases creating ruling criteria (e.g. must offer over 50 diverse funds to get a score of 90-100 in the number of funds offered field).

The quantitative fields may be scored one or more methods utilizing an actuarial present value of the fields, as a weighted average over all scenarios.

For example, the actuarial present value (APV) of a cash flow z that took place at time n for a life aged x at inception is given by:

$$APV = z \times 1 + \frac{r}{t}^{-n*t} \times {}_nP_x$$

where r is the spot interest rate
T is: number of times the spot rate is compounded per year $$1 + \frac{r}{t}^{-n*t}$$

represents the discount rate, utilizing the spot interest rate, compounded t times per year, n years out.

$_nP_x$ represents the probability of a life aged x at contract inception survives to age x+n.

In one embodiment, the product modelling process may normalize the output for each average APV of each variable to generate a score within the 0-100 ranking (or 0 to 10). In another embodiment In another embodiment, the product modelling process may use a percentage increase or decrease, and multiply by (1 plus the percentage) then multiply by 50. However this method may generate scores outside the boundaries.

While, each product feature category may be ranked separately, one embodiment of the system may include generating a product recommendation, taking into account the product owner's preferences and situation. In one embodiment, an algorithm may be coded into the model that generates an aggregate score by weighting all the variables and deriving a weighted average score as follows:

$$AggregateScore_{productz} = score_{variable1} \times weight_{variable1} + score_{variable2} \times weight_{variable2} + \ldots + score_{variablez} \times weight_{variablez}$$

where there are a total of z variables being ranked.
Each variable may have a default weight, but the user may modify the weightings.

When illustrating a product recommendation ranking, a pie chart may be generated to illustrate the weights from each component ranking. The system may then modify the weightings and visualize how the recommendation rankings would change as the weights change.

The system user may select a subset of products (typically 2 or 3) to visually compare. The user may also select a given scenario to examine. The user may: (a) select the scenario from a set of historical scenarios; (b) select the scenario from a set of several deterministic scenarios (average, good, bad, ugly); or (c) select the $x^{th}$ percentile scenario from a set of stochastically generated scenarios.

After a scenario is selected, the graphs generated by the model are updated. The user may modify some of the assumptions and visualize how the graphs change (e.g. extend deferral period).

The user may select the $x^{th}$ percentile scenario when dynamically comparing product cash flows side by side. To determine the ranking of the scenarios, the following ranking algorithm may be coded into the model:

(1) A ranking score is calculated for each of N scenario paths utilizing the ranking formula outlined below;

(2) Order the scenarios from highest to lowest score, such that the lowest score corresponds to the $100^{th}$ percentile (best scenario) and the highest score corresponds to the $0^{th}$ percentile (worst scenario);

(3) The $x^{th}$ scenario is calculated as the x %*N scenarios, rounded up to the nearest integer.

In the following ranking formula, the parameters are general approximations and not meant to represent a specific product.

$$RankingScore_{scenarios} = \sqrt{\sum_{t=1}^{H}\left(\prod_{k=1}^{t}\frac{1}{AP_k}\right)^2}$$

$$AF_k = \left(1 + r_k - w_k - \frac{f}{q}\right)^z$$

$$r_k = \sum_{p=1}^{P}(r_{k,p} \times wt_{k,p})$$

where:
AF(t)=net accumulation factor over time step t;
r(t)=gross portfolio return over time step t;
r(t,p)=gross return of fund p over time step t;
wt(t,p)=fund weighting at the beginning of time step t, after any rebalancing that may take place prior to accumulation during time step t;
f=approximate annual total fees (as a % of account value);
w(t)=approximate withdrawal taken over time step t (represented as a percent of account value). This percentage may change over time, and will be reflective of when the owner decides to begin taking withdrawals;
H=modelling horizon;
t=modelling step from time point t−1 to t;
q=modelling frequency (where annual 1; quarterly=4, monthly=12, etc.);
z=the compounding frequency over time step t and can range from 0 to infinity;
N=total number of scenarios; and
s=the scenario number In some embodiments, it would be informative to graphically compare the variable annuity product against other investment alternatives in the market. These may include fixed annuities (SPIA, FIA, etc.) and a general portfolio of equity and bond investments.

The product modelling process, in some embodiments, may generate multiple output display screens as part of the system user interface. These display screens may include product rankings by category, a chart profile of product features, and a set of graphs to compare a subset of products. Embodiments of user interface screens and model output information visualized therein are shown in FIGS. 10-14.

To display a product ranking by category, there may be a top 5 (or 10) list of all rating categories, by product score. There may also be bar charts to visually show how the products compare. Advertisements may be added around the rankings.

The display screens may contain one or more tabular profiles, or charts, of product features. These charts may list key features of each product. A list of features may include: company name; product name; product type; withdrawal percentage amount; withdrawal notes; bonus, ratchet, roll-up notes; fund selection (number of funds); fund restrictions; and charges split out by rider, M&E&A, fund charges, and total (with notes).

The modelling process output may further display a set of graphs to compare a subset of products. This provides an educational aspect for advisors who want to understand the details of these products. Thus, on one portion of a user interface display screen, a box may contain the key assumptions, with the option to expand to access more assumptions. The key assumptions that a user may access may include: equity/bond allocation; scenario selection; deferral period before first withdrawal taken; products being compared; an option to switch parts of the graph output between cash surrender value, account value, and death benefit; an option to save, print, go back to previous screen; an option to expand to full set of assumptions.

Figure 14:
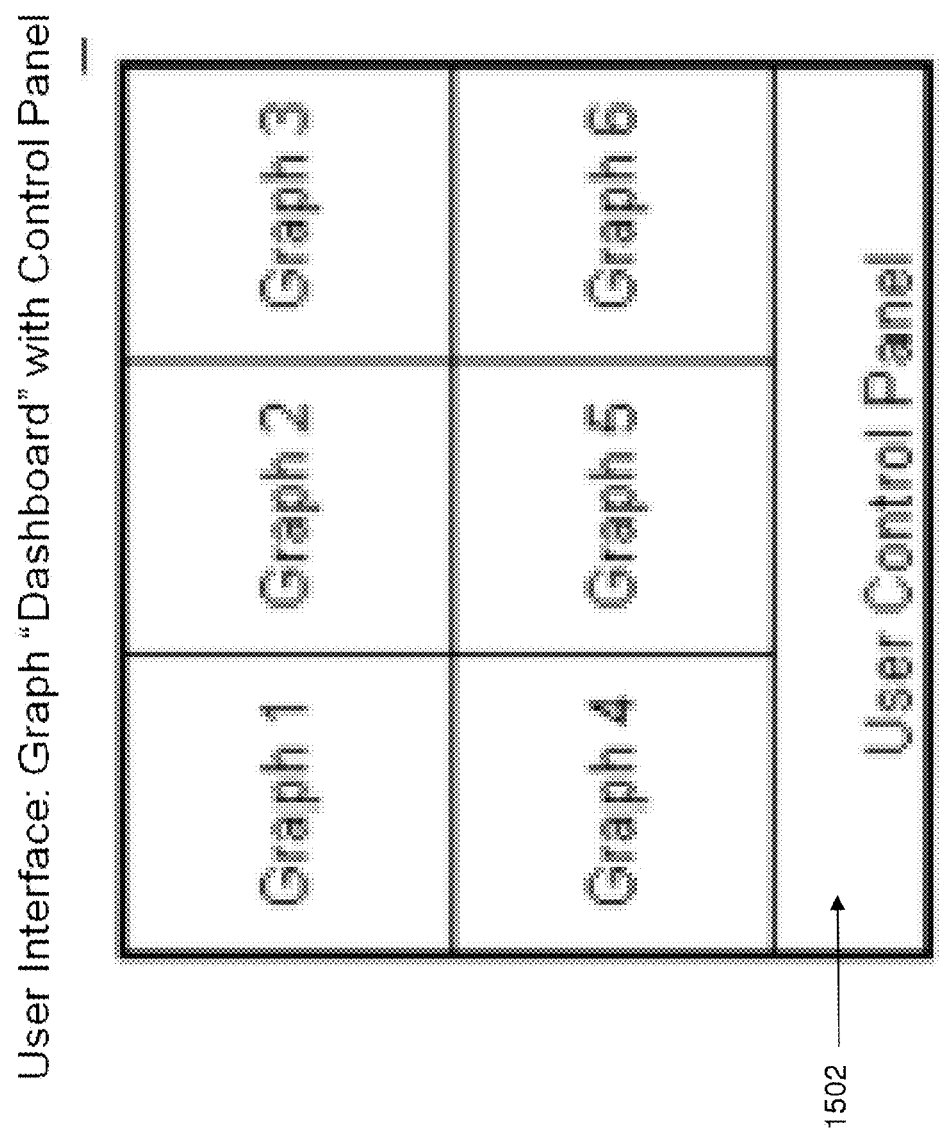
FIG. 14 illustrates a Graph Dashboard

The system user interface in which the comparison graphs are displayed to the user is built around the dynamic nature of these graphs. That is, the user can adjust the assumptions and the graphs will update in real time. Thus, FIG. 14 illustrates one embodiment of the graph "dashboard" screen that allows up to six graphs to be displayed. The user may quickly modify one or more key assumptions through the user control panel 1502 which is located below the graphs. This control panel allows the user to quickly modify the key assumptions seamlessly without having to switch screens. These key assumptions may include:

equity/bond allocation
  scenario selection
  deferral period before first withdrawal taken
  products being compared
  option to switch parts of the graph output between cash surrender value, account value, and death benefit.
  nominal vs. inflation adjusted (real) cash flows
  option to remove or add additional variables illustrated on the graphs
  option to save, print, go back to previous screen
  option to expand to full set of assumptions As shown in FIG. 14, the remainder of the display screen may be populated with a dashboard of one or more several of the following graphs:

(a) Owner cash flows 1: This graph will plot the account value, benefit base and the ongoing premiums by age (or duration).
  (b) Owner cash flows 2: This graph may be positioned directly under the Owner cash flows 1 graph, and may plot withdrawals by age (or duration).
  (c) Total Income and Fees by Duration: This graph may incorporate a set of two stacked bars above the x axis and one bar below the x axis. The first stacked bar may plot cumulative withdrawals. The second bar stacked on top of the first bar may plot the cash surrender value, the death benefit, or the account value. The bar below the x axis may plot cumulative fees. The x axis will represent the duration.
  (d) Cash Surrender Value over Contract Duration: This graph may also incorporate two stacked bars. The first bar may plot the cash surrender value, and the second bar may plot the account value above the cash surrender value, which also represents the surrender charge. The x axis will represent the duration.
  (e) Fees over Contract Duration: This graph may have two stacked bars. The first bar represents the total fees by year. The second stacked bar represents the surrender charge fees, if the owner were to surrender during the year.
  (f) Scenario Returns: This graph plots the accumulated gross and net fund returns by duration. Gross returns would generally be the same for multiple products, but could differ if one product has investment restrictions.
  (g) Death Benefits: This graph illustrates the death benefits for each product over time.

Figure 20:
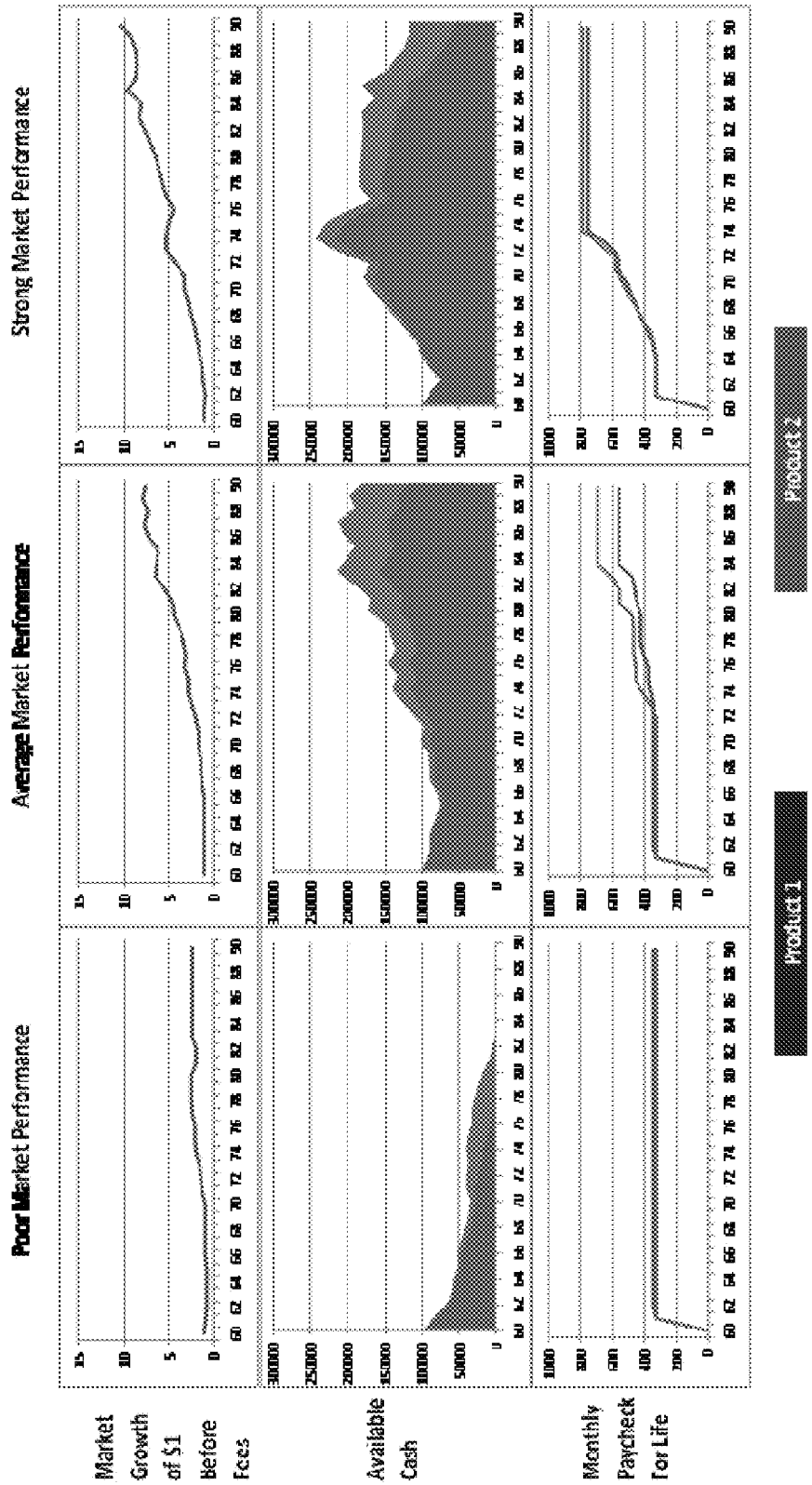
FIG. 20 illustrates one configuration of the Graph Dashboard.

FIG. 20 illustrates an alternative configuration of the graphs dashboard. In these graphs, two or more products are compared to each other. This dashboard configuration has a 3×3 matrix of graphs. The horizontal matrix illustrates the results from a "poor" "average" and "strong" market scenario. The three vertically stacked graphs are comprised of the following:

(a) Market Growth of $1 before Fees: This illustrates the accumulated gross market growth of a scenario prior to deducting any fees, by age of the policyholder
  (b) Available Cash: This illustrates the Cash Surrender Value of each product over the life of the policyholder.
  (c) Monthly Paycheck For Life: This illustrates the guaranteed withdrawal amount paid to the policyholder each month, over the life of the policyholder. This may be adjusted to show annual rather than monthly amounts.

Referring to FIG. 10, the user may be presented by the system user interface with a table 1102 that lists the top number, such as five (but may be expanded to more results), of annuity products ranked overall according to the user preferences. The user may also be presented with one or more tables 1104, 1106 that provide a rank ordering and score of the available annuities according to their individual scores for the respective characteristics. While viewing this information, the user may click on a given product name, which will bring up a new user interface window providing further product details.

The user may then select two (or more) annuities for a side-by-side comparison of expected financial performance under different market scenarios and user behavior assumptions. Alternately, a user may select a single product to understand how it works in more detail. The user can select products to compare by clicking a check box next to each product listed in the results.

Figure 11:
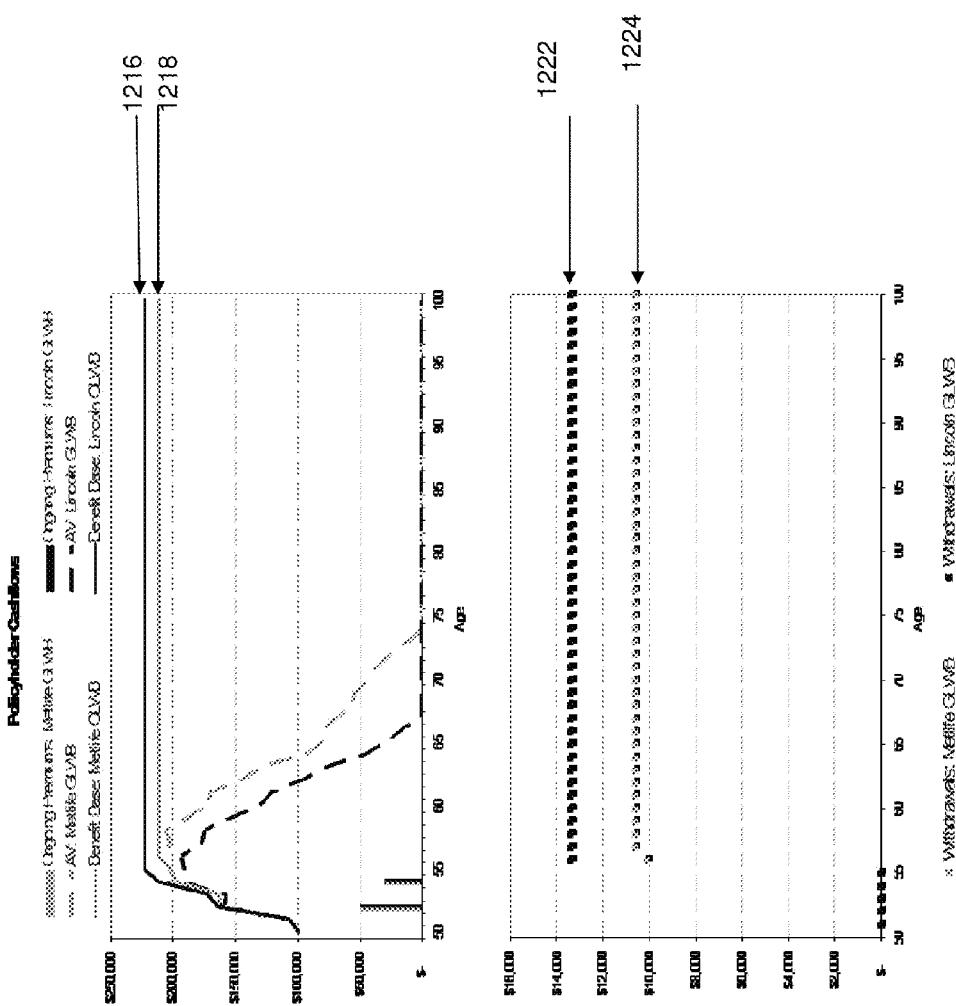
FIG. 11 illustrates the expected performance of two annuities according to a particular scenario.

For example, FIG. 11 illustrates the expected performance of two annuities according to a particular scenario and owner assumptions. In this example, the annuities are the MetLife Guaranteed Lifetime Withdrawal Benefit (GLWB) and the Lincoln GLWB. Graph 1210 shows the ongoing premiums 1202 paid into the annuities by the user, the account values 1212 and 1214 versus age (or alternatively duration) of the user, and the benefit bases 1216 and 1218 versus age (or alternatively duration). The benefit base of an annuity is typically a number which determines how total guaranteed annual withdrawals. In addition, the rider fee for the guaranteed benefit is based off the benefit base.

The data may be presented in line graph format. The data for the different annuities may be presented in different colors.

Graph 1220 shows the withdrawals 1222 and 1224 from each annuity versus age. Provision can be made for the user to select certain withdrawals from the account value, such as taking the maximum amount allowable by the guarantee without incurring any penalties, and/or deferring withdrawals for a period of time. These would then be reflected in the graphs. The account values are calculated based on a particular scenario for the investment accounts selected by the user. These will be discussed in more detail below.

Figure 12:
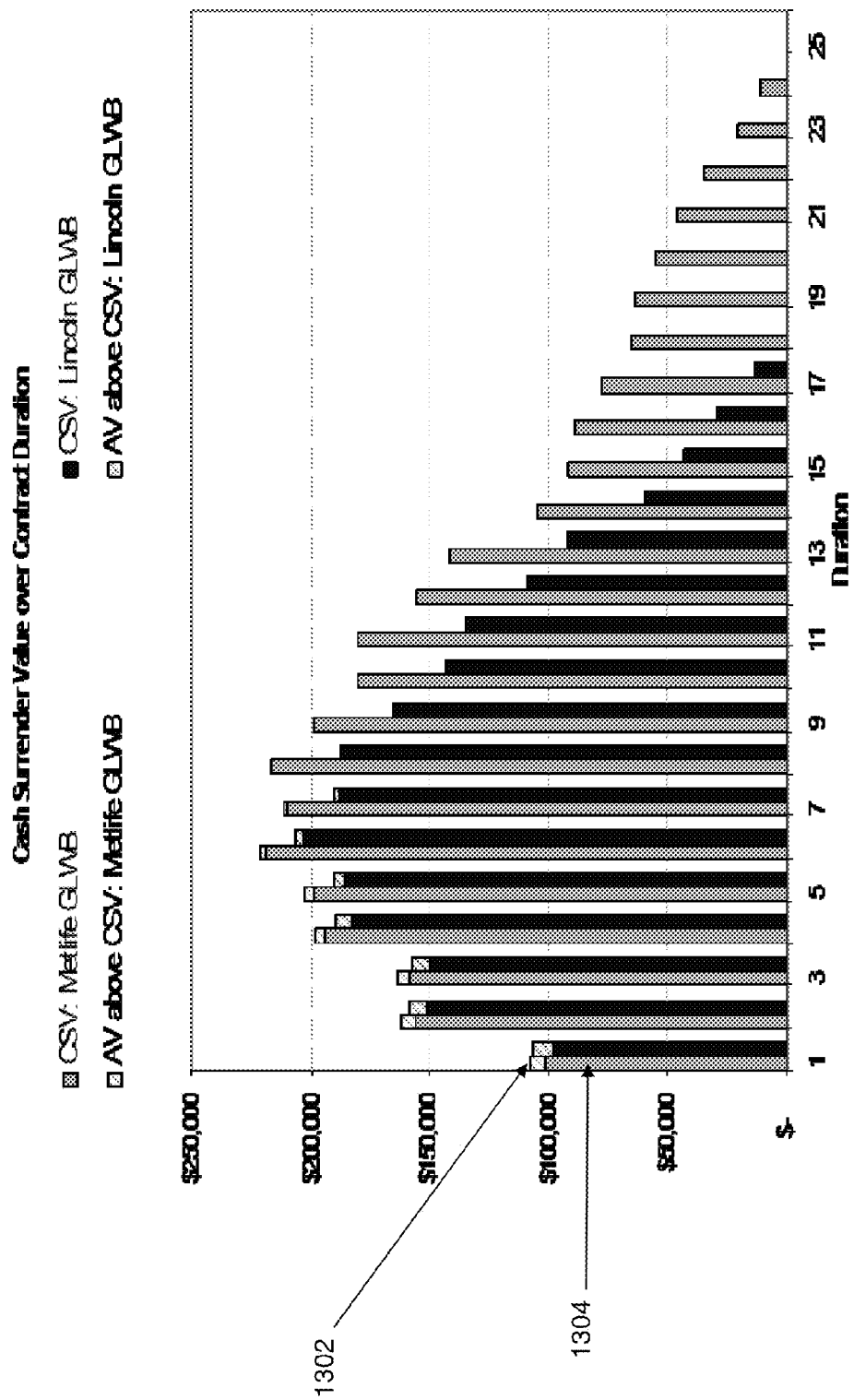
FIG. 12 illustrates the expected performance of the cash surrender value of two annuities according to a particular scenario.

FIG. 12 illustrates the expected performance of the cash surrender value of the two annuities according to a particular scenario. The surrender charge 1302 is shown on top of the cash surrender value 1304 in a bar chart format so that the total bar height represents the account value. A lighter shade is used for the surrender charge, if the product was liquidated in applicable duration.

FIGS. 11 and 12 help the user visualize how the components and features of each product contribute to the income generated and available cash surrender value (and death benefit) over time. Traditionally, this information was only available in a textual format, and therefore impossible to compare and contrast the two products on an "apples to apples" basis. However by modeling the two products using the same owner behavior, preferences, and demographic assumptions along with the same economic scenario, it is possible to compare these products side by side and make meaningful and accurate conclusions.

By modeling these different annuity products using the system and method of the present invention, the user can see the tradeoffs between, fees, features, and restrictions that result in higher guaranteed withdrawals (Lincoln product) and higher available cash value during certain durations (MetLife product). The user can then use this visualization to understand how these products work and to assist in a decision of which product to buy.

Figure 13:
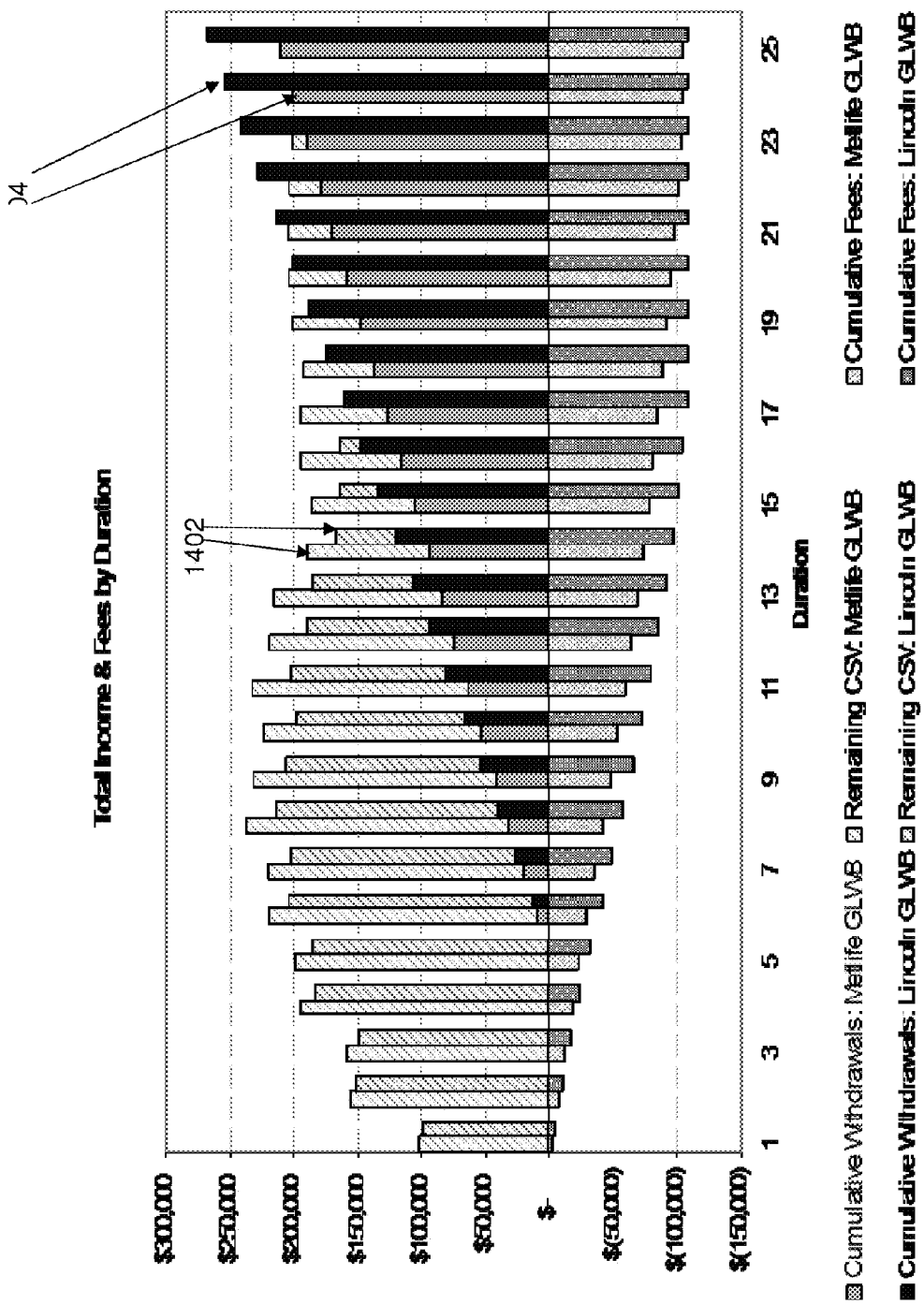
FIG. 13 illustrates the expected total value of two annuities over time according to a particular scenario.

FIG. 13 illustrates the expected total income and total fees of two annuities over time according to a particular scenario and user demographics, preferences, and behavior assumptions. The cash surrender value values 1402 are shown as a bar on top of the cumulative withdrawals 1404. The top of the bars can be thought of as the total income received up to that point (cumulative withdrawals) plus the amount available in a lump sum withdrawal at that point in time. Essentially, this tells the user the maximum cumulative income that can be received at each point in time. The total value of the MetLife annuity is shown to be higher than the total value of the Lincoln annuity until year 20.

Alternatively to showing the cash surrender value, the user can elect to show the death benefit (or account value) for each of the two products. This would illustrate the amount of aggregate income the owner would have received at each point in time, plus the available death benefit, if the owner died at that point in time (or account value in their annuity).

Total charges against an account are shown as negative bars on the same graph of FIG. 13. The user may also be provided with a choice of financial scenarios to see how the performance of the annuities might vary according to investment choices (e.g. equities vs. bonds) and economic forecasts (optimistic versus pessimistic). This will help the user anticipate how each annuity might serve his or her needs depending upon the course the future might take.

Appendix C presents how two other annuities might perform for a very optimistic and very pessimistic future financial scenario. One graph in appendix C illustrates net portfolio returns for each of the products over time. While not illustrated, this graph could also display gross portfolio returns over time.

There are a number of ways that future market scenarios may be generated. In the examples presented herein, the scenarios are chosen from a set of 10,000 validated scenarios provided in part by the American Academy of Actuaries. These scenarios are based on historical fund performance and are used by insurance companies to determine the amount of claims that could arise from issuing variable annuity products under different market conditions. This helps them set proper reserve and capital requirements. In this application, these scenarios provide a set of possible future outcomes that would be considered realistic.

Other sets of validate scenarios created by industry economic scenario generation experts, such as those offered by Numerix, Ibbotson Associates, or Barrie and Hibbert (to name a few), may be used as well. In addition, proprietary stochastic economic scenario generators may be built within the model itself and generated "on the fly" as the model runs.

The scenarios illustrated are considered real world scenarios, as the economic scenario generator is parameterized with positive risk premiums for risky asset classes. Alternatively, or in addition to real world scenarios, risk neutral scenarios could be used. Using risk neutral scenarios would provide another method to determine the value proposition. When using risk neutral scenarios to value derivatives, such as variable annuity guarantees, the result can be interpreted as the "market price" of the derivative, similar to the market price of an "At the Money" Call option on the S&P 500 with a given exercise date.

FIG. 15 illustrates suitable market proxies for investment funds of a given class. The specific funds available for a given annuity may be categorized or mapped into one or more of the asset classes used in the simulation (e.g. fund x can be suitably simulated as the results of 60% Large Cap Equity returns and 40% Small Cap Equity returns). A proxy index (or fund), such as U.S. Equity S&P 500 Total Return Index, may then be used as the basis to forecast the asset class and hence the performance of (a portion of) the specific annuity fund indicated by the user. Specifically, either the historical statistical properties of the proxy index returns or current market consistent data, such as implied volatility of the proxy index would be used to parameterize an economic scenario generator (ESG) model. This ESG would then produce a set of scenarios that are indicative of possible future outcomes of the proxy Index. Additional asset classes may be added to the model as seen fit (as dictated by the underlying funds offered under the variable annuity products).

Figure 16:
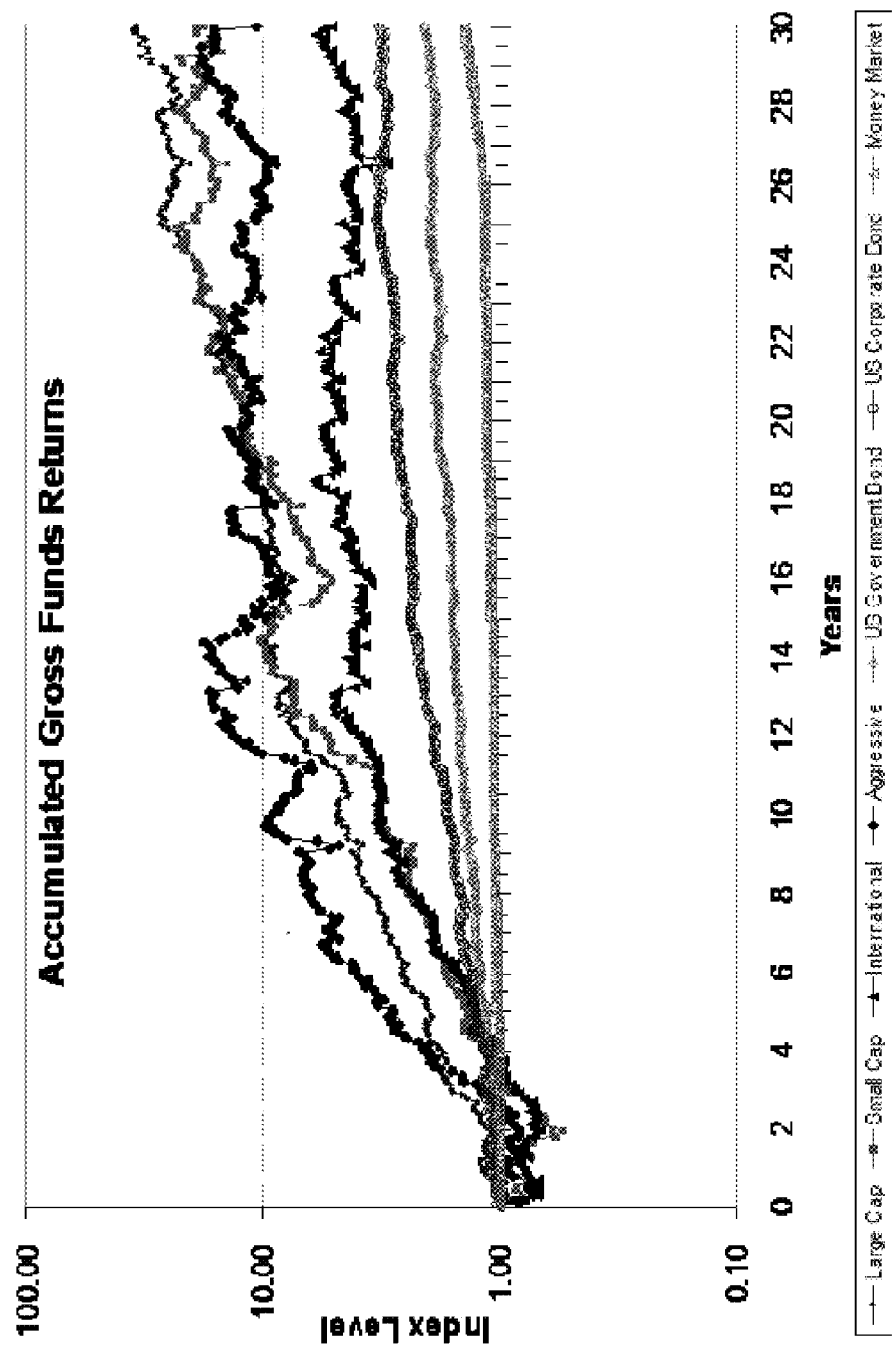
FIG. 16 illustrates hypothetical performance of market proxies according to an optimistic scenario.
Figure 17:
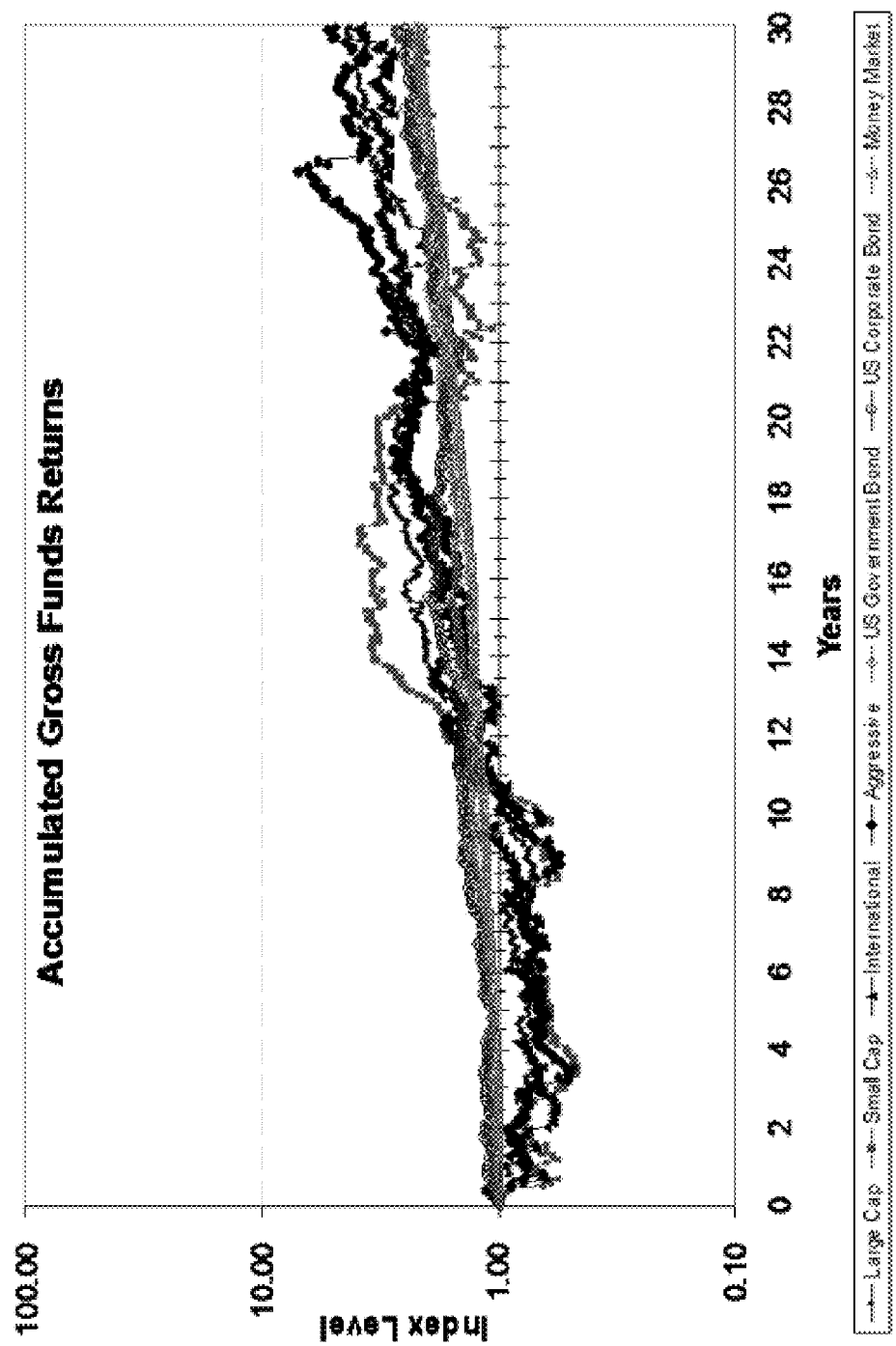
FIG. 17 illustrates hypothetical performance of market proxies according to a pessimistic scenario.

FIG. 16 illustrates a forecasted performance of market proxies for an optimistic scenario (scenario 4). FIG. 17 illustrates a forecasted performance of market proxies for a pessimistic scenario (scenario 9). Thus, FIGS. 16 and 17 illustrate the accumulation factors for each asset class over time. This can be thought of as the value that a $1 investment in each asset class would be worth at each point in time in the future, assuming the investment was credited the gross return rate.

In some embodiments, as shown in FIG. 7, the present invention allows a user to compare an existing product to other annuity products. This feature may help an owner of an existing annuity product make a decision whether to trade an existing policy for a new contract (via a 1035 exchange) or holding on to their existing contract. To use this feature, the user would log-in to the system software and user interface and select 806 the option to compare an existing product.

The system then generates a screen prompt asking the user to identify the user's existing product. The user is prompted to select a company name and the state it was purchased in from drop down menus. A list of products sold by that company is displayed, from which the user selects the owned product. The user also has the option to further narrow down the options by inputting the year the product was purchased.

After the product is selected, the owner/user is prompted to enter data necessary to determine the value of the existing product. The following data entry fields may be required Account Value, Benefit Base, Year purchased (the exact day can be entered if known), Single or joint coverage, Fund allocation between equity and fixed income, Death Benefit type, and Death Benefit Base.

The owner/user may also enter additional optional data information to further tailor the recommendation. These optional data entry fields may include fund holdings, fund fees, product fees: (M&E&A, fixed, rider fees, etc), and company satisfaction (scale 0-10).

After the user/owner has entered existing product information, the system transitions to the same set of user interface screens described above for shopping for and modelling a new product. From that point, the product modelling process is similar, except that the rankings include the existing product as well as the new products. Similarly, the comparison graphs contain the existing product and contract it against new potential products.

In some embodiments, as also shown in FIG. 7, the present invention allows a user to perform a product lookup. This option allows the user to research a specific product, learn about the product features, and view graphic illustrations.

When the user selects this option 808, the user is presented with a user interface screen prompting the user to select a product by company, product name, or product type. Alternatively, the use may perform a keyword search. A list of matches is then displayed from which the user may select one or more products to lookup.

The next user interface screen in this product look-up option displays a tabular chart of key product features, as described above. From there, the user may look at a graphic illustration of the product. If the user is known to the system, the graph displayed may be populated using the saved settings. Otherwise, a dialog box may prompt the user for key data, including age, time of first withdrawal, asset allocation, and scenario. After the user enters this data into the system, graphs will be displayed as described above and the user may modify the assumptions as desired.

Another option that may be presented to a user by the system is the General Product Education, as shown on FIG. 7. This option will educate the user on terminology and mechanics behind the product features, through videos, a searchable glossary, and the interactive graphs. If the user selects this option, the system user interface may present the following further options: Instructional Videos; Search Glossary for Terms; Interactive Education through Graphs; and News and Updates.

The instructional videos may range in topics, but generally cover the following categories: Frequently asked questions, Demonstrational videos on how to use the system; General Product Features Overview; and How to analyze results.

The glossary may allow the user to look up a definition of any term used by the system when describing the products. In addition, there may be an annuity translator that allows the user to enter in a term found in a prospectus as well as the company that uses the term, and the equivalent term in the generic language.

The Interactive Educational Graphs are similar but not identical to the set of graphs discussed above. The Interactive Educational Graphs graphs allow a user to start with a basic, generic variable annuity, and add features to see how it changes the product payout. Several generic products can be compared to see how the different features look. For example, the comparisons may include a 5% simple interest deferral bonus vs. a 4.5% compound interest deferral bonus. The user also has the option to search for products that are similar to their generic product that they have created. The graphs also have the ability to compare a variable annuity guarantee to other investment products such as a fixed income annuity, Single Premium Immediate Annuity, or a mutual fund, for example.

The News and Updates section may display news in the retirement industry as well as news of product updates, amendments and new product filings.

Figure 18:
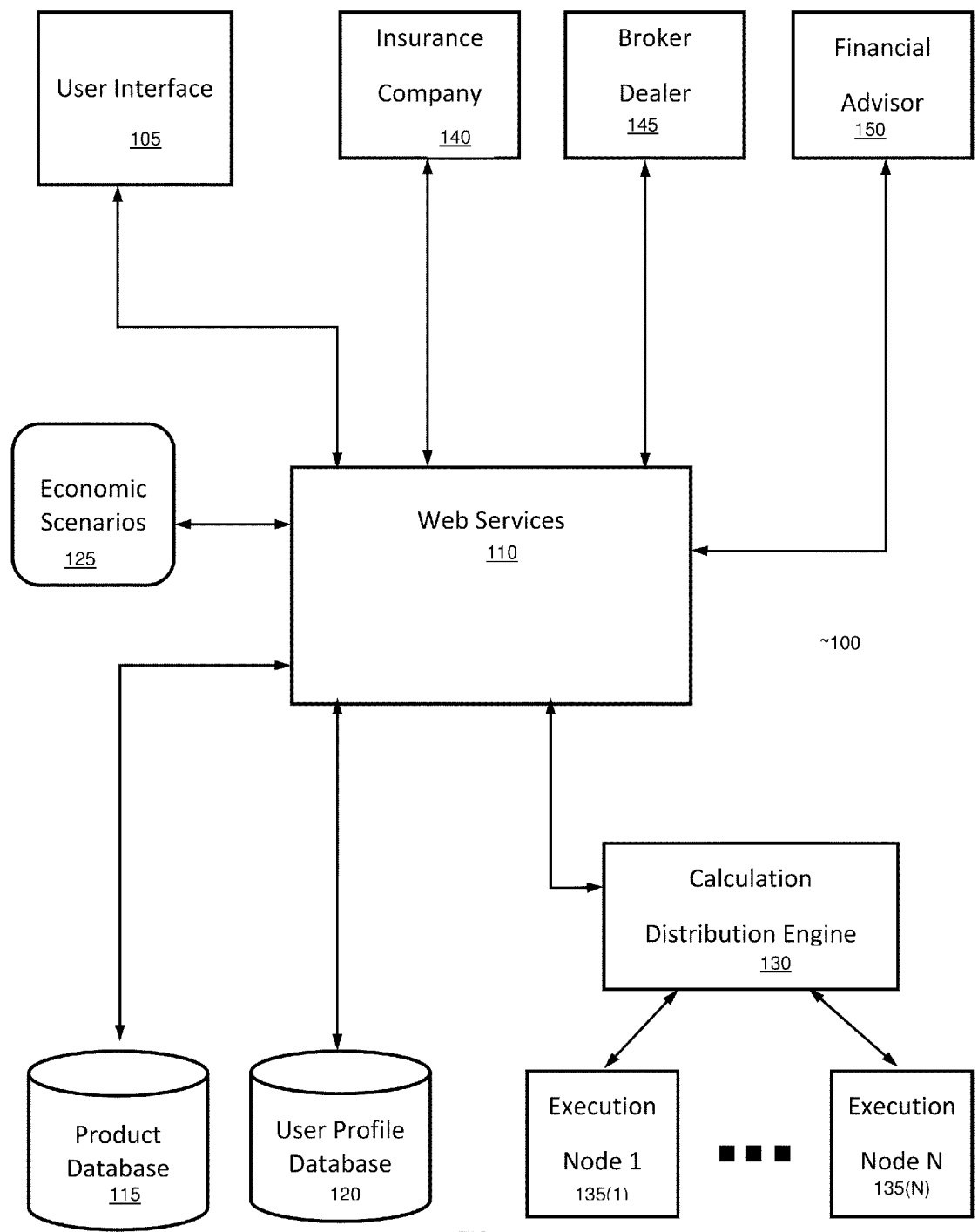
FIG. 18 is a block diagram showing an arrangement of system hardware and software components in accordance with one embodiment of the present invention.

FIG. 18 illustrates one embodiment of an arrangement of hardware components and software modules that can be used to implement the system and methods of the present invention. The system 100 may be accessed by users from a portable or desktop computing device that includes a system user interface 105. A system user may interact with the interface 105 by entering parameters, viewing results, and saving and retrieving their user profile data as described above. The user interface 105 may be web-based (e.g. generated inside a web browser, a web-based application for a portable or handheld device) or may be a desktop platform.

The user interface 105 may communicate with system web services 110. In one embodiment, web services 110 is a central hardware and software hub that connects and commands the front end and back end processes needed to implement the system functionality described above. Thus, the web services 110 will further communicate with a product database 115 that warehouses model configurations (described above) corresponding to various financial products that are analyzed by the system. The web services 110 may further communicate with a user profile database 120 that reads and writes all user profile information as described above.

An economic scenarios module 125 interacts with web services 110. It stores the pre-generated stochastic and historical economic scenarios used by the system 100 and holds model configurations and calibration parameters that are used by the system to generate stochastic scenarios on demand.

The system 100 may further include a calculation distribution engine 130 that is functionally linked to web services 110 and to one or more execution nodes 135(1 . . . N). The execution nodes 135 are web servers that run system calculations. The calculation distribution engine 130 schedules and distributes the outstanding set of system calculation jobs among the available execution nodes 135.

The system 100 may be functionally linked to a plurality of different types of system users, such as one or more insurance companies 140, broker-dealers 145, and financial advisors 150. Using this functional link to the system the insurance companies may update their respective product profiles for annuities (PPfA) in real time to ensure that all product parameters are up to date. Also, end-users (product shoppers) may use the system 100 to communicate a product order directly to an insurance company user 140. The insurance company 140 will receive all necessary information to process the transaction. An end-user who owns an annuity can download existing product information about that annuity from the corresponding insurance company 140 so that the product can be analyzed in the system.

A broker-dealer user 145 may upload broker-specific compliance rule sets that will incorporated to any of their respective financial advisors 150 that use the system. The financial advisor users may retrieve end-user profiles when given permission and may upload client details from their computer to the system 100 to analyze existing or potential product.

The methods and system of the present invention can be applied to variable annuities and to other investment products, such as FIA or equity indexed annuities, SPIA products, other fixed annuities, and life insurance products.

While this process has been explained for the use of an individual, the software may be set up so that, after a user sees their results, they may wish to discuss them further with a financial advisor. The user can elect to save their results and allow the advisor to access them.

Financial advisors and a lay end-user may have different variations of the software. Some of the functionality may be limited to the lay user. Also, for a financial advisor user 150, the universe of available products may be limited to what they or their company sells. This can be handled by the login credentials the financial advisor would use.

All information entered into the models may be stored on a server in the system 100, which would allow for studies to see how product owners plan on using their respective products.

Thus, although there have been described particular embodiments of the present invention of a new and useful system and method for evaluation and comparison of variable annuity products, it is not intended that such references be construed as limitations upon the scope of this invention except as set forth in the following claims.

What is claimed is:

1. A method of using an annuity comparison system to evaluate and compare financial performance of one or more variable annuity products for the benefit of a prospective product purchaser, the annuity comparison system including computer hardware and computer software, the method comprising the steps of:
   (a) receiving product specification data corresponding to each annuity product to be evaluated, the product specification data for each annuity product including product feature terminology, the product feature terminology identifying product features present in each annuity product using terminology corresponding to a common product glossary, the common product glossary comprising a glossary containing generic terminology identifying key features found in the annuity products;
   (b) using the product specification data and one or more annuity performance equations, defining in the computer software at least one annuity product model;
   (c) receiving purchaser demographic data into the annuity comparison system for use by the annuity product model;
   (d) receiving purchaser preference data into the annuity comparison system for use by the annuity product model, the purchaser preference data comprising purchaser preferences for annuity product types and annuity product features;
   (e) using the annuity product model, simulating financial performance for each annuity product based on the purchaser demographic data and the purchaser preference data;
   (f) using results from simulating the financial performance of each annuity product, outputting from the system a product ranking for each annuity product according to one or more annuity product performance characteristics, wherein the step of outputting a product ranking for each annuity product includes outputting an aggregate score product ranking and one or more separate product rankings corresponding to separate product performance characteristics;
   (g) receiving one or more market scenarios into the system for use by the annuity product model, the market scenarios comprising predicted performance data for investments defined in the products;
   (h) receiving one or more owner behavior assumptions into the system for use by the annuity product model, the owner behavior assumptions comprising the expected product utilization behavior and preferences defined by the purchaser for different annuity product features;
   (i) using the market scenarios and owner behavior assumptions in the model to simulate the financial performance for each product;
   (j) using results from simulating the financial performance of each annuity product based on market scenarios and owner behavior assumptions, outputting from the system a product performance chart, the product performance chart displaying one or more of predicted account values, predicted cash surrender values, predicted death benefits, product fees and monthly, annual or cumulative withdrawals over a period of ownership of each product; and
   (k) wherein the step of defining at least one annuity product model further comprises testing cash flows from the annuity product model against a deterministic model for the product being modeled, wherein the cash flows comprise one or more of account values, benefit base, premiums, and withdrawals associated with the annuity product being modeled and wherein the deterministic model for the product comprises a model having an output defined by annuity product parameter settings and parameter data input into the model.

2. The method of claim 1, the purchaser preference data further comprising expected product utilization behavior, wherein the expected product utilization behavior represents how and when the purchaser expects to utilize one or more of the annuity product features.

3. The method of claim 1 wherein:
   the product specification data includes data representing one or more guaranteed living benefit (GLB) or Guaranteed Minimum Death Benefit (GMDB) riders available for each product; and
   the purchaser preferences include a selection of at least one GLB or GMDB rider.

4. The method of claim 1 further comprising the step of adjusting an output of the product performance chart to show one of either nominal or inflation-adjusted cash flows.

5. The method of claim 1 wherein the step of outputting the product performance chart further comprises outputting a bar chart, the bar chart comprising a plurality of bars for each annuity product, wherein each bar comprises a first portion representing one of the predicted cash surrender value, the predicted account value, and the predicted death benefit, and a second portion representing one of either annual or cumulative withdrawals from the product.

6. The method of claim 5 wherein:
   the step of outputting the product performance chart further comprises a outputting a combination of bar and line charts corresponding to each annuity product.

7. The method of claim 1 wherein the step of receiving one or more market scenarios into the system further comprises selecting a market scenario for use by the annuity product model from a set of market scenarios that have been validated as suitable for one of either estimating insurance reserve requirements or based on historically observed market performance.

8. The method of claim 1 wherein the step of receiving the product specification data comprises:
   obtaining product prospectus data for each product;
   entering the product prospectus data into a prospectus tracking data form;
   identifying and adding new product feature terminology to the common product glossary; and
   updating the annuity product model using the new product feature terminology.

9. The method of claim 8 wherein the step of receiving the product specification data further comprises entering product specification data for each annuity product into a pre-defined product specification template.

10. The method of claim 8 wherein the step of receiving the product specification data further comprises entering annuity product parameter data into a parameter record data form.

11. The method of claim 1 wherein the step of defining at least one annuity product model further comprises testing cash flows from the annuity product model against cash flow examples found in a product prospectus published for the product being modeled.

12. The method of claim 1 further comprising:
   after simulating the financial performance for each annuity product based on initial purchaser preference data, changing at least some of the purchaser preference data;
   using the annuity product model, simulating the financial performance for each annuity product based on the purchaser demographic data and the changed purchaser preference data; and using results from simulating the financial performance of each annuity product based on the changed purchaser preference data, outputting from the system an updated product ranking for each annuity product according to one or product performance characteristics.

* * * * *